United States Patent
Szucs

(10) Patent No.: US 8,095,468 B2
(45) Date of Patent: Jan. 10, 2012

(54) METHOD FOR PROVIDING PROTECTED AUDIO/VIDEO CONTENT

(75) Inventor: Paul Szucs, Ostfildern (DE)

(73) Assignee: Sony Deutschland GmbH, Cologne (DE)

(*) Notice: Subject to any disclaimer, the term of this patent is extended or adjusted under 35 U.S.C. 154(b) by 1158 days.

(21) Appl. No.: 11/572,319

(22) PCT Filed: Jul. 18, 2005

(86) PCT No.: PCT/EP2005/007801
§ 371 (c)(1),
(2), (4) Date: Jan. 19, 2007

(87) PCT Pub. No.: WO2006/008116
PCT Pub. Date: Jan. 26, 2006

(65) Prior Publication Data
US 2008/0097919 A1    Apr. 24, 2008

(30) Foreign Application Priority Data

Jul. 19, 2004  (EP) ..................... 04017019
May 17, 2005  (EP) ..................... 05010686
Jun. 21, 2005  (EP) ..................... 05013393

(51) Int. Cl.
*G06F 21/00*  (2006.01)

(52) U.S. Cl. ............ 705/57; 705/50; 705/51; 705/901; 705/902; 705/903; 705/904; 380/201; 380/202; 380/203; 380/204

(58) Field of Classification Search ................. 705/57
See application file for complete search history.

(56) References Cited

U.S. PATENT DOCUMENTS

| | | | |
|---|---|---|---|
| 6,611,607 B1 | 8/2003 | Davis et al. | |
| 7,174,567 B2* | 2/2007 | Keramane | 726/26 |
| 2004/0071312 A1 | 4/2004 | Ogawa et al. | |
| 2005/0149450 A1* | 7/2005 | Stefik et al. | 705/58 |

FOREIGN PATENT DOCUMENTS

| | | |
|---|---|---|
| EP | 1 282 262 | 2/2003 |
| JP | 2001-357622 | 12/2001 |
| JP | 2001-357622 A * | 12/2001 |
| JP | 2003-50745 | 2/2003 |
| JP | 2003-518282 | 6/2003 |
| JP | 2003-228636 | 8/2003 |
| JP | 2004-5365 | 1/2004 |
| WO | 03/039155 | 5/2003 |
| WO | 03/075575 | 9/2003 |
| WO | WO 03/081499 A1 | 10/2003 |
| WO | WO 03/098931 A1 | 11/2003 |
| WO | WO 2004/038568 A2 | 5/2004 |

OTHER PUBLICATIONS

Perritt—Knowbots, Permissions Headers & Contract Law (Apr. 2-3, 1993 with revisions of Apr. 30, 1993). Retrieved online Aug. 30, 2011. http://archive.ifla.org/documents/infopol/copyright/perh2.txt.*

Office Action mailed Apr. 12, 2011, in Japanese Patent Application No. 2007-521878 (with English-language translation).

Office Action issued Jun. 8, 2011, in Chinese Patent Application No. 200580023961.3 (Submitting English translation only).

* cited by examiner

*Primary Examiner* — James A Reagan

(74) *Attorney, Agent, or Firm* — Oblon, Spivak, McClelland, Maier & Neustadt, L.L.P.

(57) ABSTRACT

A method for providing protected content, wherein content usage rights information and/or usage state information is embedded into obtained primary data that serves as a basis for a content item to be provided thereby providing the primary data with the embedded content usage rights information and/or usage state information as the content item.

45 Claims, 20 Drawing Sheets

| Usage_property (Uprop) | Description |
| --- | --- |
| 0000 | Copy Control |
| 0001 | Concurrent Render Restriction |
| 0010 | Time-based Usage Restriction |
| 0011 | Content Scrambling Not Required |
| 0100 – 0111 | Reserved |
| 1000 | Restrict to Authorised Domain |
| 1001 | Restrict to Localized Authorised Domain |
| 1010 | Restrict to Geographic Area |
| 1011 | Restrict to Local Environment |
| 1100 – 1101 | Reserved |
| 1110 | Controlled Export |
| 1111 | Propagation Restriction Not Asserted |

Tab. 1

Fig. 4

| Syntax | No. of bits | Identifier |
|---|---|---|
| generic_usage_state_information_coding_syntax(){ | | |
|   for (i=0;i<N;i++){ | | |
|     usage_property | 4 | uimsbf |
|     usage_parameter | 4 | uimsbf |
|     If (((usage_property == 0000) && (usage_parameter == 0010)) | | |
|     || (usage_property == 0010)){ | | |
|       usage_argument | 8 | uimsbf |
|     } | | |
|     If ((usage_property == 0100) && | | |
|     ((usage_parameter == 0000) || (usage_parameter == 0001))) { | | |
|       usage_argument | 40 | bslbf |
|     } | | |
|     If ((usage_property == 0100) && (usage_parameter == 0010)) { | | |
|       usage_argument | 24 | uimsbf |
|   } | | |
| } | | |

Tab. 1'

Fig. 4'

Fig. 4 "Tab. 1"

| Syntax | No. of bits | Identifier |
|---|---|---|
| generic_usage_state_information_coding_syntax(){ | | |
|   top_level_propagation_restriction_usage_property | 8 | uimsbf |
|   top_level_content_management_loop_length | 8 | uimsbf |
|   for (i=0;i<N;i++){ | | |
|     content_management_usage_property | 8 | uimsbf |
|   } | | |
|   outer_propagation_restriction_loop_length | 8 | uimsbf |
|   for (i=0;i<M;i++){ | | |
|     outer_propagation_restriction_usage_property | 8 | uimsbf |
|     outer_content_management_loop_length | 8 | uimsbf |
|     for (j=0;j<P;j++){ | | |
|       outer_content_management_usage_property | 8 | uimsbf |
|     } | | |
|     inner_propagation_restriction_length | 8 | uimsbf |
|     inner_propagation_restriction_usage_property | 8 | uimsbf |
|     inner_content_management_loop_length | 8 | uimsbf |
|     for (j=0;j<Q;j++){ | | |
|       inner_content_management_usage_property | 8 | uimsbf |
|     } | | |
|   } | | |
| } | | |

| Usage Property (Uprop) | Description | Usage Parameter (Upar) | Description | Argument |
|---|---|---|---|---|
| 0000 | Copy Control | 0000 | Copy Control Not Asserted | None |
| | | 0001 | Copy One Generation | 8 bits: Maximum number of copies; 0x0 means no restriction; 0x1 is equivalent to Copy Once |
| | | 0010 | Copy Once | None |
| | | 0011 | Copy No More | None |
| | | 0100 | Copy Never | None |
| | | 0101 | Copy Never, Zero Retention | None |
| | | 0110 – 1111 | Reserved for future use | |
| 0001 | Concurrent Render Restriction | 0000 | Restriction not asserted | None |
| | | 0001 | Restriction asserted | 8 bits: Maximum number of concurrent renderings |
| 0010 | Time-based Usage Restriction | 0000 | Restriction not asserted | None |
| | | 0001 | From (absolute data/time) | 40 bits: as for *start_time* field in EIT section |
| | | 0010 | Until (absolute data/time) | 40 bits: as for *start_time* field in EIT section |
| | | 0011 | For (relative time) | 24 bits: as for *duration* field in EIT section |
| | | 0100 – 1111 | Reserved | None |
| 0011 | Content Scrambling Not Required | 0000 | Reserved | None |
| 0100-0111 | Reserved for future use | 0000 – 1111 | Reserved | None |

Fig. 4a

Tab. 1a

| Usage Property (Uprop) | Description | Usage Parameter (Upar) | Description | Argument |
|---|---|---|---|---|
| 1000 | Restrict to authorised domain | 0000 | Reserved | None |
| 1001 | Restrict to localized authorised domain | 0000 | Reserved | None |
| 1010 | Restrict to geographic area | 0000 | Excluded Area | Data to identify the geographic area |
|  |  | 0001 | Included Area | Data to identify the geographic area |
|  |  | 0010 – 1111 | Reserved | None |
| 1011 | Restrict to local environment | 0000 | Reserved | None |
| 100 – 1101 | Reserved for future use | 0000 – 1111 | Reserved | None |
| 1110 | Controlled Export | 0000 | Disable Export | 8-bit identifier of external system |
|  |  | 0001 | Enable Export | 8-bit identifier of external system |
|  |  | 0010 – 1111 | Reserved | None |
| 1111 | Propagation restriction not asserted | 0000 | Reserved | None |

Fig. 4b

Tab. 1b

| Syntax | No. of bits | Identifier |
|---|---|---|
| generic_usage_state_information_coding_syntax(){ | | |
|   for (i=0;i<N;i++){ | | |
|     content_management_usage_property | 8 | uimsbf |
|   } | | |
|   Propagation_restriction_loop_length | | |
|   for (i=0;i<M;i++){ | | |
|     propagation_restriction_usage_property | | |
|     content_management_loop_length | | |
|     for (j=0;j<P;j++){ | | |
|       content_management_usage_property | 8 | uimsbf |
|     } | | |
|     inner_propagation_restriction_loop_length | | |
|     inner_propagation_restriction_usage_property | 8 | uimsbf |
|     content_management_loop_length | | |
|     for (j=0;j<Q;j++){ | | |
|       content_management_usage_property | 8 | uimsbf |
|     } | | |
|   } | | |
| } | | |

Tab. 2

Fig. 5

| Syntax | No. of bits | Identifier |
|---|---|---|
| content_management_usage_property (){ | | |
|     usage_property | 4 | uimsbf |
|     usage_parameter | 4 | uimsbf |
|     If (((usage_property == 0000) && (usage_parameter == 0011)) | | |
|     || (usage_property == 0001)){ | | |
|         usage_argument | 8 | uimsbf |
|     } | | |
|     If ((usage_property == 0011) && | | |
|     (((usage_parameter == 0000) || (usage_parameter == 0001))){ | | |
|         usage_argument | 40 | bslbf |
|     } | | |
|     If ((usage_property == 0011) && (usage_parameter == 0010)){ | | |
|         usage_argument | 24 | uimsbf |
|     } | | |
| } | | |

Tab. 2a

Fig. 5a

| Syntax | No. of bits | Identifier |
|---|---|---|
| content_management_usage_property (){ | | |
|   usage_property | 4 | uimsbf |
|   usage_parameter | 4 | uimsbf |
|   If (((usage_property == 0000) && (usage_parameter == 0011)) | | |
|   || (usage_property == 0001)){ | | |
|     usage_argument | 8 | uimsbf |
|   } | | |
|   If ((usage_property == 0011) && | | |
|   ((usage_parameter == 0000) || (usage_parameter == 0001))) { | | |
|     usage_argument | 40 | bslbf |
|   } | | |
|   If ((usage_property == 0011) && (usage_parameter == 0010)) { | | |
|     usage_argument | 24 | uimsbf |
|   } | | |
| } | | |

Tab. 2b

Fig. 5b

| Syntax | No. of bits | Identifier |
|---|---|---|
| usage_state_information_descriptor(){ | | |
|   descriptor_tag | 8 | uimsbf |
|   descriptor_length | 8 | uimsbf |
|   generic_usage_state_information_coding_syntax(){ | | |
|   } | | |
| } | | |

Tab. 3

Fig. 6

| Syntax | No. of bits | Identifier |
|---|---|---|
| copyright_descriptor(){ | | |
|   descriptor_tag | 8 | uimsbf |
|   descriptor_length | 8 | uimsbf |
|   copyright_identifier | 32 | uimsbf |
|   generic_usage_state_information_coding_syntax(){ | | |
|   } | | |
| } | | |

Tab. 4

Fig. 7

METHOD FOR PROVIDING PROTECTED AUDIO/VIDEO CONTENT

The present invention relates to a method for providing protected audio/video content.

The present invention relates in particular to a method for providing protected audio/video content in or for a content protection and copy management system, which is based on a network of devices. More particular, the present invention relates to a definition of and to a method for the communication of audio/visual content usage rules in a content protection copy management system in a consumer environment.

Networks of devices and therefore methods for providing data and content within procedures of operating said networks become more and more important. Several security aspects arise also in connection with respect to audio/visual content protection and copy management requirements when networked devices are provided with respective content items.

Known methods for providing protected content and in particular known methods for providing protected content usage rules USI in or for a content protection and copy management system have a comparably high data load with respect to the content protection and copy management requirements.

It is an object underlying the present invention to provide a method for a more efficient and more practicable communication of usage rules UR or usage state information USI in or for audio/video content and audio/video content streams.

The object is achieved by methods for providing content according to independent claims 1, 2, 5, 6. Preferred embodiments of the inventive method for providing content are within the scope of the dependent sub-claims. The object is further achieved by a system or an apparatus, by a computer program product, by a computer readable storage medium and by usage rights information and/or usage state information according to independent claims 37, 38, 39, and 40, respectively.

According to the present invention the proposed method for providing content is in particular adapted to work in or for a content protection and copy management system and comprises processes of (a) obtaining primary data as or being representative for a content item to be provided, of (b) obtaining content usage rights information and/or usage state information which is descriptive for usage rights or the usage state with respect to the content item to be provided, of (c) embedding said content usage rights information and/or usage state information or a derivative thereof into said primary data or a derivative thereof, thereby generating secondary data as or being representative for a content item to be provided and of (d) providing said secondary data or a derivative thereof as said content item to be provided with the embedded content usage rights information and/or usage state information.

It is therefore a key idea of the present invention in its broadest sense to embed within a method for providing protected content usage rights information and/or usage state information into obtained primary data which serve as a basis for a content item to be provided and to thereby provide said primary data with the embedded content usage rights information and/or usage state information as said content item.

Said content usage rights information and/or usage state information may be embedded in a structured binary coded form within said primary data or said derivative thereof. This has in particular the advantage that interoperability can be achieved, in particular by using a binary code as shown in table 2.

Alternatively or additionally, said content usage rights information and/or said usage state information may be embedded repeatedly—in particular regularly—within said primary data or said derivative thereof. This is of particular advantage when performing with continuous content streams, i.e. within DVB or the like.

Both latter measures—taken alone or in combination—in particular ensure efficiency, interoperability, and user friendliness with respect to said content usage rights information (CURI) and/or usage state information (USI) and its handling.

According to a preferred embodiment of the inventive method for providing content said process (a) of obtaining said primary data may comprise a sub-process of generating said primary data partly or completely.

On the other hand, said process (a) of obtaining said primary data may comprise a sub-process of partly or completely receiving said primary data or a preform thereof, in particular from an external source.

Said process (b) of obtaining content usage rights information (CURI) and/or usage state information may comprise a sub-process of partly or completely generating said content usage rights information and/or usage state information, in particular in a given target format and/or in particular with a given target scope of rights.

Alternatively or additionally, said process (b) of obtaining content usage rights information and/or usage state information may comprise a sub-process of partly or completely receiving said content usage rights information and/or usage state information, in particular from an external source and/or in a given input format.

One known format may be used as said input format. Interoperability is thereby achieved by conversion of the known format into a particular simple and common UR/USI format.

Said received content usage rights information and/or usage state information may be subjected to a sub-process of usage rights format conversion in order to convert the input format of said received content usage rights information and/or usage state information to a given target format.

In said sub-process of usage rights format conversion said content usage rights information and/or usage state information may also be converted in order to have all cover given a target scope of rights.

A single data item may be provided as said content item or as a part thereof, in particular a single file, a single image or the like.

Alternatively or additionally, a data stream may be provided as said content item or as a part thereof, in particular a sequence of files, a sequence of images and/or sounds or the like.

A further preferred embodiment of the inventive method may comprise a process for multiplexing several content items or preforms thereof and in particular for multiplexing the respective content usage rights information and/or usage state information of multiplexed content items.

The process (c) of embedding said content usage rights information and/or usage state information or a derivative thereof into said primary data or a derivative thereof may be made capable of a sub-process of multiplexing in order to combine primary data of a plurality of content items to be provided into a common multiplexed content stream.

Further, the process (c) of embedding said content usage rights information and/or usage state information or a derivative thereof into said primary data or a derivative thereof may be made capable of embedding content usage rights information and/or usage state information about content items available in the future.

From said content usage rights information and/or usage state information other components of auxiliary data already defined may be formed.

In said process (c) of embedding the target format for said content usage rights information and/or usage state information and/or the target scope for said content usage rights information and/or usage state information may be chosen in accordance to an underlying content protection and copy management system or CPCM system.

In said process (c) of embedding the target format for said content usage rights information and/or usage state information (USI) and/or the target scope for said content usage rights information (CURI) and/or usage state information (USI) may be chosen in order to support and/or cover a minimal and/or optimized set of content usage rights information (CURI) and/or usage state information (USI) with respect to an underlying content protection and copy management system or CPCM system.

Said set of content usage rights information and/or usage state information may comprise a set of mandatory content usage rights information and/or usage state information and an optional or assertive set of content usage rights information and/or usage state information.

Each content item to be provided may be provided with at least one item of said mandatory set of content usage rights information and/or usage state information.

Said set of content usage rights information and/or usage state information may comprise a set of content usage rights information and/or usage state information concerning content management functions, and a set of content usage rights information and/or usage state information concerning content propagation restrictions.

Each content item to be provided may be provided with at least one item of said set of content management usage rights information and/or usage state information, and with at least one item of said set of propagation restriction usage rights information and/or usage state information.

Said set of content management usage rights information and/or usage state information may comprise one or an arbitrary plurality of items of the group of items which consists of copy control—in particular as mandatory, concurrent render count, disable content scrambling (where applicable and under the control of the CPCM system), time-based content usage.

The usage state information for copy control may be adapted to cover one or an arbitrary plurality of items of the group of items which may consist of:

"copy never, zero retention" (CNZR) according to which no copy of such content is allowed, nor is a secure non user-accessible temporary buffer copy allowed for the purpose of pausing the playback, "copy never" (CN) according to which no copy of such content is allowed, except for a secure non user-accessible temporary buffer copy allowed for the purpose of pausing the playback, "copy once" (C1) according to which exactly one single copy of the content can be created, "copy one generation" (C1G) according to which the content can be copied repeatedly, but each copy is then marked as copy no more, "copy no more" (CNM) according to which no further copies are allowed, except for a secure non user-accessible temporary buffer copy allowed for the purpose of pausing the playback, "copy control not asserted" (CCNA) according to which no restriction is placed upon copying of the content.

Additionally or alternatively, the usage state information for propagation restriction is adapted to cover one or an arbitrary plurality of items of the group of items which may consist of:

"restrict to content protection and copy management system (CPCM)" (RTCPCM) according to which an item of content with this state applied is to remain protected by the CPCM system, being the default propagation restriction setting for content to be protected, "restrict to authorized domain (AD)" (RTAD) according to which an item of content with this state applied will not be allowed to propagate beyond the set of CPCM-compliant equipment belonging to the user receiving the content, thus allowing the user to use the content at home, access it from a remote location, for example a second home or from a mobile handset, "restrict to localized authorized domain (AD)" (RTLAD) according to which an item of content with this state applied will not be allowed to propagate by electronic transfer beyond the close vicinity of the point at which that content entered the consumer environment, within a respective authorized domain (AD), "restrict to geographic area" (RTGA) according to which an item of content with this state applied is not intended to propagate by electronic transfer outside the indicated geographic area, "restrict to local environment" (RTLE) according to which an item of content with this state applied will not be allowed to propagate by electronic transfer beyond the close vicinity of the point at which that content entered the consumer environment, "controlled export" (CE) according to which an item of content with this state applied can either be allowed to propagate, or not allowed to propagate to a particular protection system (for such systems not implicitly and universally trusted by the CPCM system), "usage by CPCM extension" (EXT) according to which an item of content with this state applied can be provided with distinct content management usage properties within the realms of some known system which provides content protection and copy management functionality as an extension to the CPCM system, "propagation restriction not asserted" (PRNA) according to which an item of content can be redistributed also outside of the content protection and copyright management system or CPCM framework.

A generation and/or the display of icons may be enabled which indicates allowed and/or disallowed functionalities with respect to the respective provided content item.

It is a further aspect of the present invention to provide a system or an apparatus which is adapted and arranged and which comprises means for realizing the inventive method for providing content and the steps thereof.

It is still a further aspect of the present invention to provide a computer program product comprising computer program means, which is adapted and arranged in order to realize the inventive method for providing content, and the steps thereof and the system when it is executed on a computer or a digital signal processing means.

Still further, a computer readable storage medium is provided comprising a computer program product according to the present invention.

Usage rights information (CURI) and/or usage state information (USI) in particular for protected audio/video content for a content protection and copy management system based on a network of devices, are proposed according to the present invention.

Said usage rights information (CURI) and/or usage state information (USI) preferably comprise one or an arbitrary plurality of items of the group of items which consists of content management USI—in particular as mandatory for an item of content within the CPCM system, and propagation restriction USI—in particular as optional or assertive for an item of content within the CPCM system.

Said content management usage rights information (CURI) and/or usage state information (USI) preferably comprise one or an arbitrary plurality of items of the group of items which consists of copy control—in particular as mandatory, concurrent render count—in particular either as mandatory or assertive, time-based content usage—in particular either as mandatory or assertive, and disable content scrambling—in particular as assertive.

Within said content management usage rights information (CURI) and/or usage state information (USI) the usage state information (USI) for copy control may be adapted in order to cover one of the items of the group of items which consists of:
  "copy never, zero retention" (CNZR) according to which no copy of such content is allowed, nor is a secure non user-accessible temporary buffer copy allowed for the purpose of pausing the playback,
  "copy never" (CN) according to which no copy of such content is allowed, except for a secure non user-accessible temporary buffer copy for the purpose of pausing the playback,
  "copy once" (C1) according to which exactly one single copy of the content can be created,
  "copy one generation" (C1G) according to which the content can be copied repeatedly, but each copy is then marked as copy no more,
  "copy no more" (CNM) according to which no copies are allowed,
  "copy control not asserted" (CCNA) according to which no restriction is placed upon copying of the content.

Said content management usage rights information (CURI) and/or usage state information (USI) may further be adapted in order to cover the items of "concurrent render count", in particular in order to be able to restrict the number of concurrent renderings of an item of content.

Said content management usage rights information (CURI) and/or usage state information (USI) may further be adapted in order to cover the items of "time-based restriction of content usage", in particular in order to be able to allow only a temporary usage of a given content item.

Said content management usage rights information (CURI) and/or usage state information (USI) may further be adapted in order to cover the items of "content scrambling not required", in particular in order to be able to choose to avoid the protection of content by means of cryptographic tools, i.e. by scrambling.

Additionally or alternatively, said propagation restriction usage rights information (CURI) and/or usage state information (USI) may be adapted in order to cover one of the items of the group of items which consists of:
  "restrict to content protection and copy management system (CPCM)" (RTCPCM) according to which an item of content with this state applied is to remain protected by the CPCM system, being the default propagation restriction setting for content to be protected,
  "restrict to authorized domain (AD)" (RTAD) according to which an item of content with this state applied will not be allowed to propagate beyond the set of CPCM-compliant equipment belonging to the user receiving the content, thus allowing the user to use the content at home, access it from a remote location, for example a second home or from a mobile handset,
  "restrict to localized authorized domain (AD)" (RTLAD) according to which an item of content with this state applied will not be allowed to propagate by electronic transfer beyond the close vicinity of the point at which that content entered the consumer environment, within the respective authorized domain (AD), whereby the localized AD is thus a subset of the AD,
  "restrict to geographic area (GA)" (RTGA) according to which an item of content with this state applied is not intended to propagate by electronic transfer outside the geographic area indicated,
  "restrict to local environment (LE)" (RTLE) according to which an item of content with this state applied will not be allowed to propagate by electronic transfer beyond the close vicinity of the point at which that content entered the consumer environment, whereby the LE is thus essentially a subset of any geographic area, if specified,
  "controlled export of content" (CE) according to which an item of content can be either allowed or disallowed to propagate to a different protection system that is not implicitly and universally trusted by the CPCM system,
  "usage by CPCM extension" (EXT) according to which an item of content with this state applied can be provided with distinct content management usage properties within the realms of some known system which provides content protection and copy management functionality as an extension to the CPCM system,
  "propagation restriction not asserted" (PRNA) according to which an item of content can be redistributed also outside of the content protection and copyright management system or CPCM framework.

In said usage rights information and/or usage state information a first or usage property information part may be used in order to indicate one of said usage rights information and/or usage state information items and a second or usage parameter information part may be used in order to further specify the usage rights information and/or usage state information item indicated by said first or usage purpose information part.

Additionally, within said usage rights information and/or usage state information said first or usage property information part may be mapped in a one-to-one relationship onto a first finite binary code, in particular consisting of four binary bits and/or wherein said second or usage parameter information part may be mapped in a one-to-one relationship onto a second finite binary code, in particular consisting of four binary bits.

Additionally and alternatively, within said usage rights information and/or usage state information said first or usage property information part may be embedded within said usage rights information and/or usage state information as an ordered concatenation of the bits of said first finite binary code of the respective usage rights information and/or usage state information item, and/or said second or usage parameter information part may be embedded within said usage rights information and/or usage state information as an ordered concatenation of the bits of said second finite binary code of the further specification of the respective usage rights information and/or usage state information item.

Additionally and alternatively, a usage rights information and/or usage state information is proposed which is embedded within said usage rights information and/or usage state information as an ordered concatenation of the bits of said first finite binary code of the respective usage rights information and/or usage state information item for said first or usage property information part and the bits of said second finite binary code of the further specification of the respective usage rights information and/or usage state information item for said second or usage parameter information part.

Preferably, said usage rights information and/or usage state information may be formed with respect to said bits of said first finite binary code of the respective usage rights information and/or usage state information item for said first or usage property information part according to the following table:

| Usage_property (Uprop) | Description |
| --- | --- |
| 0000 | Copy Control |
| 0001 | Concurrent Render Restriction |
| 0010 | Time-based Usage Restriction |
| 0011 | Content Scrambling Not Required |
| 0100-0111 | Reserved |
| 1000 | Restrict to CPCM System |
| 1001 | Restrict to Authorised Domain |

-continued

| Usage_property (Uprop) | Description |
| --- | --- |
| 1010 | Restrict to Localized Authorised Domain |
| 1011 | Restrict to Geographic Area |
| 1100 | Restrict to Local Environment |
| 1101 | Controlled Export |
| 1110 | Usage by CPCM Extension |
| 1111 | Propagation Restriction Not Asserted |

Of the 16 possible usage property codes, the first 8 are used for Content Management Usage Properties and the second 8 are used for Propagation Restriction Usage Properties.

Preferably, said content management usage rights information and/or usage state information may be formed with respect to said bits of said first finite binary code of the respective usage rights information and/or usage state information item for said first or usage property information part and with respect to said bits of said second finite binary code of the further specification of the respective usage rights information and/or usage state information item for said second or usage parameter information part according to the following table

| Usage Property (Uprop) | Description | Usage Parameter (Upar) | Description | Argument |
| --- | --- | --- | --- | --- |
| 0000 | Copy Control | 0000 | Copy Never, Zero Retention | None |
| | | 0001 | Copy Never | None |
| | | 0010 | Copy Once | None |
| | | 0011 | Copy One Generation | 8 bits: Maximum number of copies; 0x0 means no restriction; 0x1 is equivalent to Copy Once |
| | | 0100 | Copy No More | None |
| | | 0101 | Copy Control Not Asserted | None |
| | | 0110-1111 | Reserved for future use | None |
| 0001 | Concurrent Render Restriction | 0000 | Restriction not asserted | None |
| | | 0001 | Restriction asserted | 8 bits: Maximum number of concurrent renderings |
| 0010 | Time-based Usage Restriction | 0000 | Restriction not asserted | None |
| | | 0001 | From (absolute data/time) | 40 bits: as for start_time field in EIT section |
| | | 0010 | Until (absolute data/time) | 40 bits: as for start_time field in EIT section |
| | | 0011 | For (relative time) | 24 bits: as for duration field in EIT section |
| | | 0100-1111 | Reserved | None |
| 0011 | Content Scrambling Not Required | 0000 | Reserved | None |
| 0100-0111 | Reserved for future use | 0000-1111 | Reserved | None |

Preferably, said propagation restriction usage rights information and/or usage state information may be formed with respect to said bits of said first finite binary code of the respective usage rights information and/or usage state information item for said first or usage property information part and with respect to said bits of said second finite binary code of the further specification of the respective usage rights information and/or usage state information item for said second or usage parameter information part according to the following table

| Usage Property (Uprop) | Description | Usage Parameter (Upar) | Description | Argument |
|---|---|---|---|---|
| 1000 | Restrict to CPCM system | 0000 | Reserved | None |
| 1001 | Restrict to authorised domain | 0000 | Reserved | None |
| 1010 | Restrict to localized authorised domain | 0000 | Reserved | None |
| 1011 | Restrict to geographic area | 0000 | Excluded Area | Data to identify the geographic area |
|  |  | 0001 | Included Area | Data to identify the geographic area |
|  |  | 0010-1111 | Reserved | None |
| 1100 | Restrict to local environment | 0000 | Reserved | None |
| 1101 | Controlled Export | 0000 | Disable Export | 8-bit identifier of external system |
|  |  | 0001 | Enable Export | 8-bit identifier of external system |
|  |  | 0010-1111 | Reserved | None |
| 1110 | Usage by CPCM Extension | 0000 or 0000-1111 | Reserved or 4-bits higher CPCM Extension id | 8-bit lower CPCM Extension id |
| 1111 | Propagation restriction not asserted | 0000 | Reserved | None |

The method to signal geographic areas should be some existing standard like, for example, ISO3166 for country codes.

This syntax allows the flexible and efficient coding of USI to enable the specification of different content management USI for different realms of propagation. The full USI syntax allows the coding of content management USI entries after each propagation restriction entry to specify the usage rules in that realm.

The basic set of USI in general consists of a propagation restriction usage property followed by a set of content management usage properties, which are valid within that propagation realm.

The complete USI data structure for an item of content may consist of one or more such basic sets of USI, depending on the intended propagation and management rules for that content.

In the simplest case there is just one such basic unit of USI specified for an item of content. This structure also allows more complex scenarios to be defined, whereby the complete USI data structure for an item of content may consist of several such basic units of USI. There are logical rules for the structuring of different propagation realms for an item of content. These are explained in the following.

In the USI data structure for an item of content, a first section consisting of the default propagation and content management USI defines the top-level content management usage rights for the content item.

If the content item is to have a propagation restriction within the CPCM system asserted, with no propagation allowed outside of this restricted realm, then that propagation restriction is the default top-level propagation restriction for that content item.

This first default section is optionally followed by a section defining the outer propagation restriction USI for the content item. The outer propagation restriction can be any one of the propagation restriction usage properties except "restrict to CPCM system", which can only be the default propagation restriction, if present there.

If the default or outer propagation restriction is "propagation restriction not asserted" (PRNA), then no other propagation restriction should be specified. Such propagation restriction setting also implies that the first default content management USI should preferably comprise of the set of "copy control not asserted" (CCNA) and "do not scramble" (DNSC), with no other content management USI specified or asserted. This set of USI gives a suitable set of usage rules for content subject to Creative Commons or similar license, within the CPCM system.

If there is an outer propagation restriction for "controlled export" then that shall be the only controlled export USI for that content. Controlled export is thus effectively a globally valid propagation restriction.

The, or each, outer propagation restriction USI can optionally be followed by an additional set of content management USI, for the purpose of specifying a different set of content management usage rules for that content item which shall apply only within the area corresponding to the foregoing outer propagation restriction USI.

For example it may be desirable that certain content be freely copyable within the authorized domain, but not outside of the authorized domain, where it is rather only allowed to be consumed. In this case the globally valid content management USI would specify "copy never" (CN), while an outer propagation restriction would be set for "restrict to authorized domain", and an additional set of content management USI would be defined here specifying "copy control not asserted" (CCNA).

In general the content management USI for the outer propagation restriction shall be less constrictive than the globally applicable content management USI.

It is feasible to specify multiple outer propagation restrictions, by setting one of each of any combination of "restrict to authorized domain", and/or "restrict to geographic area" and/or "restrict to local environment". In case outer propagation restrictions are specified for both "restrict to geographic area" and "restrict to local environment" then the content management USI for "restrict to local environment" shall be less constrictive than that for "restrict to geographic area".

The outer propagation restriction USI and optional respective content management USI section is optionally followed by a section defining the inner propagation restriction USI for the content item. The inner propagation restriction can be one of the propagation restriction usage properties "restrict to localized authorized domain (AD)" (RTLAD) or "restrict to local environment (LE)" (RTLE). If the outer propagation restriction is "restrict to authorized domain (AD)" (RTAD) then only "restrict to localized authorized domain (AD)" (RTLAD) is valid as the corresponding inner propagation restriction USI. If the outer propagation restriction is "restrict to geographic area" (RTGA) then only "restrict to local environment (LE)" (RTLE) is valid as the corresponding inner propagation restriction USI.

The inner propagation restriction USI can optionally be followed by an additional set of content management USI, for the purpose of specifying a different set of content management usage rules for that content item which shall apply only within the area corresponding to the foregoing inner propagation restriction USI.

For example it may be desirable that certain content be freely viewable within the localized authorized domain, but only after 24 hours after initial broadcast outside of the authorized domain. In this case the outer propagation restriction would be set for "restrict to authorized domain", and an additional set of content management USI would be defined here specifying "time based usage restriction" with usage parameter setting "from" and the time argument set to the value corresponding to the time 24 hours after initial broadcast, and the inner propagation restriction would be set to "restrict to localized authorized domain", and an additional set of content management USI would be defined here specifying "time based usage restriction" with usage parameter setting "not asserted", thus relaxing the time based usage restriction asserted for the non-localized part of the authorized domain.

In general the content management USI for the inner propagation restriction shall be less constrictive than that for the associated outer propagation restriction.

In general the content management USI specified for the localized authorized domain inner propagation restriction shall be less constrictive than that specified for the local environment, if both propagation restrictions are asserted for a content item.

The propagation restriction "restrict to local environment" can be either an outer or inner propagation restriction, but not both for the same content item.

In general the content management USI usage property settings specified in the first top-level section are also valid for the outer and inner propagation restrictions unless the respective content management USI usage property contains a different setting for either the outer and/or the inner propagation restriction.

Further aspects of the present invention are given as follows:

According to the present invention said usage rights information (CURI) and/or usage state information (USI) are formed with respect to said bits of said first finite binary code of the respective usage rights information (CURI) and/or usage state information (USI) item for said first or usage property information part (UProp) and with respect to said bits of said second finite binary code of the further specification of the respective usage rights information (CURI) and/or usage state information (USI) item for said second or usage parameter information part (UPar) according to the following tables

| Usage Property (Uprop) | Description | Usage Parameter (Upar) | Description | Argument |
|---|---|---|---|---|
| 0000 | Copy Control | 0000 | Copy Control Not Asserted | None |
| | | 0001 | Copy One Generation | 8 bits: Maximum number of copies; 0x0 means no restriction; 0x1 is equivalent to Copy Once |
| | | 0010 | Copy Once | None |
| | | 0011 | Copy No More | None |
| | | 0100 | Copy Never | None |
| | | 0101 | Copy Never, Zero Retention | None |
| | | 0110-1111 | Reserved for future use | None |
| 0001 | Concurrent Render Restriction | 0000 | Restriction not asserted | None |
| | | 0001 | Restriction asserted | 8 bits: Maximum number of concurrent renderings |

-continued

| Usage Property (Uprop) | Description | Usage Parameter (Upar) | Description | Argument |
|---|---|---|---|---|
| 0010 | Time-based Usage Restriction | 0000 | Restriction not asserted | None |
| | | 0001 | From (absolute data/time) | 40 bits: as for start_time field in EIT section |
| | | 0010 | Until (absolute data/time) | 40 bits: as for start_time field in EIT section |
| | | 0011 | For (relative time) | 24 bits: as for duration field in EIT section |
| | | 0100-1111 | Reserved | None |
| 0011 | Content Scrambling Not Required | 0000 | Reserved | None |
| 0100-0111 | Reserved for future use | 0000-1111 | Reserved | None | and

| Usage Property (Uprop) | Description | Usage Parameter (Upar) | Description | Argument |
|---|---|---|---|---|
| 1000 | Restrict to CPCM system | 0000 | Reserved | None |
| 1001 | Restrict to authorised domain | 0000 | Reserved | None |
| 1010 | Restrict to localized authorised domain | 0000 | Reserved | None |
| 1011 | Restrict to geographic area | 0000 | Excluded Area | Data to identify the geographic area |
| | | 0001 | Included Area | Data to identify the geographic area |
| | | 0010-1111 | Reserved | None |
| 1100 | Restrict to local environment | 0000 | Reserved | None |
| 1101 | Controlled Export | 0000 | Disable Export | 8-bit identifier of external system |
| | | 0001 | Enable Export | 8-bit identifier of external system |
| | | 0010-1111 | Reserved | None |
| 1110 | Usage by CPCM Extension | 0000 or 0000-1111 | Reserved or 4-bits higher CPCM Extension id | 8-bit lower CPCM Extension id |
| 1111 | Propagation restriction not asserted | 0000 | Reserved | None |

In the USI data structure for an item of content a first section consisting of a top-level propagation restriction followed by associated content management USI may be given which defines the default content management usage rights for the content item, for example throughout the CPCM system.

Said top-level propagation restriction may be given as any one of the propagation restriction usage properties "restrict to CPCM system", "restrict to authorized domain (AD)", "restrict to geographic area" (RTGA) or "restrict to local environment (LE)" (RTLE).

Said first section consisting of said mandatory top-level propagation restriction and content management USI may be followed by a section defining the outer propagation restriction USI for the content item.

Said outer propagation restriction may be given as any one of the propagation restriction usage properties, except that specifying "restrict to CPCM system", which can only be the default propagation restriction, if asserted.

If said top-level propagation restriction is given as one of the propagation restriction usage properties "restrict to authorized domain (AD)", "restrict to geographic area" (RTGA) or "restrict to local environment (LE)" (RTLE), then that constitutes also said outer propagation restriction for the content. In each case the content is not intended to propagate outside the indicated propagation realm.

Said top-level or outer propagation restriction may be "propagation restriction not asserted" (PRNA), in which case no further propagation restriction should be specified, and the first top-level propagation restriction may be "restrict to CPCM system", and the first top-level content management USI may comprise one of the group consisting of "copy control not asserted" (CCNA) and "do not scramble" (DNSC), with no other content management USI specified.

An outer propagation restriction may be given for "controlled export" to be the only controlled export USI for the given content in order to realize controlled export as an effectively globally valid propagation restriction.

An outer propagation restriction may be given for "usage by CPCM extension" to provide different USI for use with the given content within the realms of the specified known system as an extension to the CPCM system.

For each such CPCM extension system, only one such outer propagation restriction for "usage by CPCM extension" may be specified for the given content.

There may be more than one such outer propagation restriction for "usage by CPCM extension" whereby each one provides alternative content management usage properties for the respective CPCM extension system.

An outer propagation restriction USI as any one of the propagation restriction usage properties "restrict to authorized domain (AD)" and "restrict to geographic area" (RTGA) may be followed by an additional set of content management USI, in particular in order to specify a different set of content management usage rules for a given content item which shall apply only within the area corresponding to the foregoing outer propagation restriction USI.

Content management USI for an outer propagation restriction may be less constrictive than the applicable top-level content management USI.

An outer propagation restriction USI and any respective content management USI section may be followed by a section defining the inner propagation restriction USI for a given content item.

An inner propagation restriction may be one of the group of which comprises the propagation restriction usage properties "restrict to localized authorized domain (AD)" (RTLAD) and "restrict to local environment (LE)" (RTLE).

An outer propagation restriction may be "restrict to authorized domain (AD)" (RTAD). Only "restrict to localized authorized domain (AD)" (RTLAD) may be valid as a corresponding inner propagation restriction USI.

An outer propagation restriction may be "restrict to geographic area" (RTGA). Only "restrict to local environment (LE)" (RTLE) may be valid as a corresponding inner propagation restriction USI.

An inner propagation restriction USI may be followed by an additional set of content management USI in order to specify a different set of content management usage rules for a given content item which shall apply only within the area corresponding to the foregoing inner propagation restriction USI.

A content management USI for an inner propagation restriction may be less constrictive than that for an associated outer propagation restriction.

A content management USI specified for the localized authorized domain inner propagation restriction is less constrictive than that specified for a local environment, if both propagation restrictions are asserted for a content item.

A propagation restriction "restrict to local environment" may be one of an outer and an inner propagation restriction, but not both for the same content item.

A content management USI usage property settings which are specified in a first top-level or default section may also be valid for outer and inner propagation restrictions unless the respective content management USI usage property contains a different setting for either the outer and/or the inner propagation restriction.

If the outer restriction is "restrict to authorized domain" then the optional inner restriction may be "restrict to localized authorized domain".

If the outer restriction is "restrict to a geographic area" then the optional inner restriction may be "restrict to local environment".

In these cases the usage rights information (CURI) and/or usage state information (USI) may allow only restricted usage within a wider realm, and freer usage within an inner realm.

An outer propagation may be "restrict to AD" and content management there is "copy one generation" or "copy control not asserted", and a second outer propagation may be "restrict to local environment" and content management there is "copy never".

Copying may be allowed inside the AD, but members and/or devices of another, or no AD can only view the content if they are connected locally.

A "downloadable packaged media" model may be given or coded as an outer propagation "restrict to AD" and content management as "copy once".

A "pay TV broadcast content" model may be given or coded as an outer propagation "restrict to AD" and content management as "copy control not asserted".

A "free-to-air broadcast content" model may be given or coded as an outer propagation "restrict to LE" and content management as "copy control not asserted".

A "video-on-demand content" model may be given or coded as an outer propagation "restrict to LE" and content management as "copy never zero retention" plus "concurrent consumption count=1".

In the following these and further aspects of the present invention will be become more elucidated by the following remarks:

The invention inter alia relates to a definition of and method for the communication of audio-visual content usage rules e.g. in a content protection and/or copy management system for instance in the consumer environment.

The invention provides a definition of the complete set of usage rules for audio/visual content in a consumer domain as well as a method for communicating the same within—for example—a content protection and digital rights management system. The set of usage rules is designed in order to be minimal in its extension and in order to encourage a consumer understanding and acceptance while still enabling the full range of reasonable constraints required by relevant content providers.

In the following the present invention will be discussed in more detail by taking reference to the accompanying Figures.

FIG. 4, 4', 4" are tables Tab. 1, 1' and 1", respectively, which demonstrate a generic preferred coding of the set of usage properties.

FIG. 4*a* is a table Tab. 1*a*, which shows a generic preferred coding of the set of usage properties, parameters, and arguments for the content management usage properties.

FIG. 4b is a table Tab. 1b, which shows a generic preferred coding of the set of usage properties, parameters, and arguments for the propagation restriction usage properties.

FIG. 5 is a table Tab. 2 which shows a proposed coding/syntax for each usage state information property.

FIG. 5a is a table Tab. 2a which shows a syntax for each usage state information property and the respective usage parameters and arguments of the content management usage properties.

FIG. 5b is a table Tab. 2b which shows a syntax for each usage state information property and the respective usage parameters and arguments of the propagation restriction usage properties.

FIG. 6 is a table Tab. 3 which shows a preferred syntax of the usage state information descriptor in DVB SI.

FIG. 7 is a table Tab. 4 which shows a preferred syntax of the usage state information descriptor when applied to the MPEG-2 Systems copyright descriptor.

Figure 8:
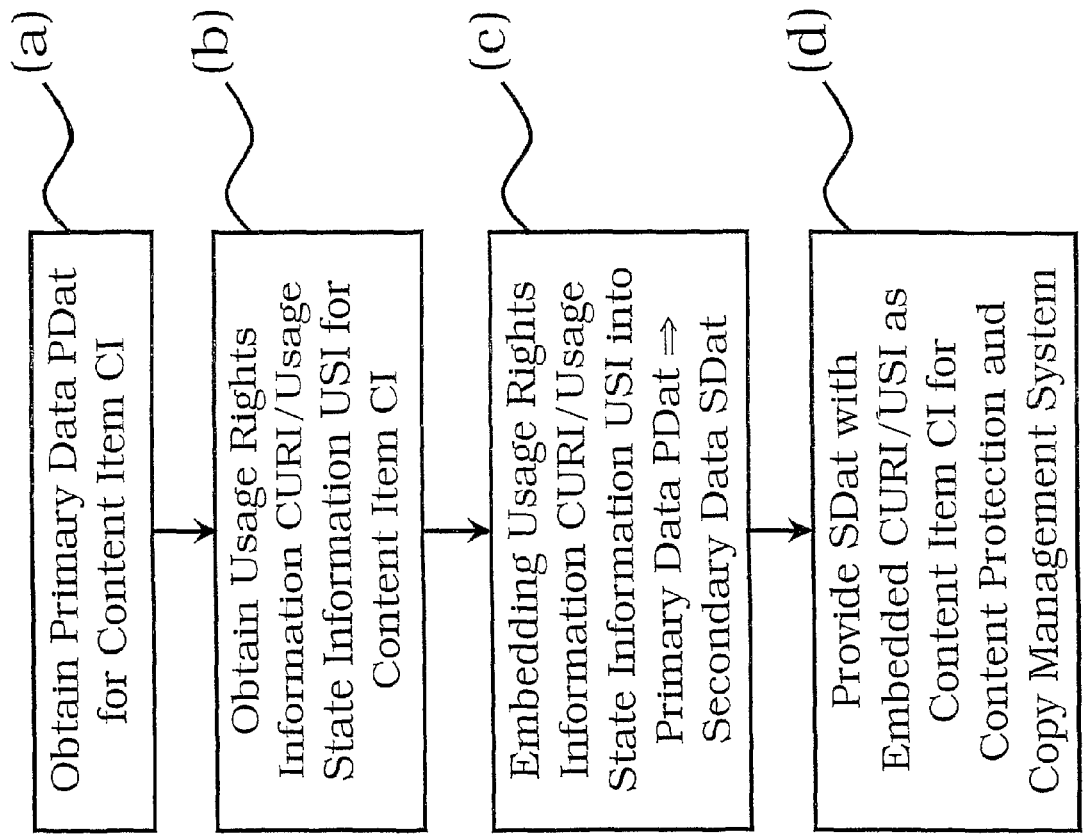

FIG. 8 is a schematical block diagram, which elucidates some basic aspects of an embodiment of the present invention.

Figure 9:
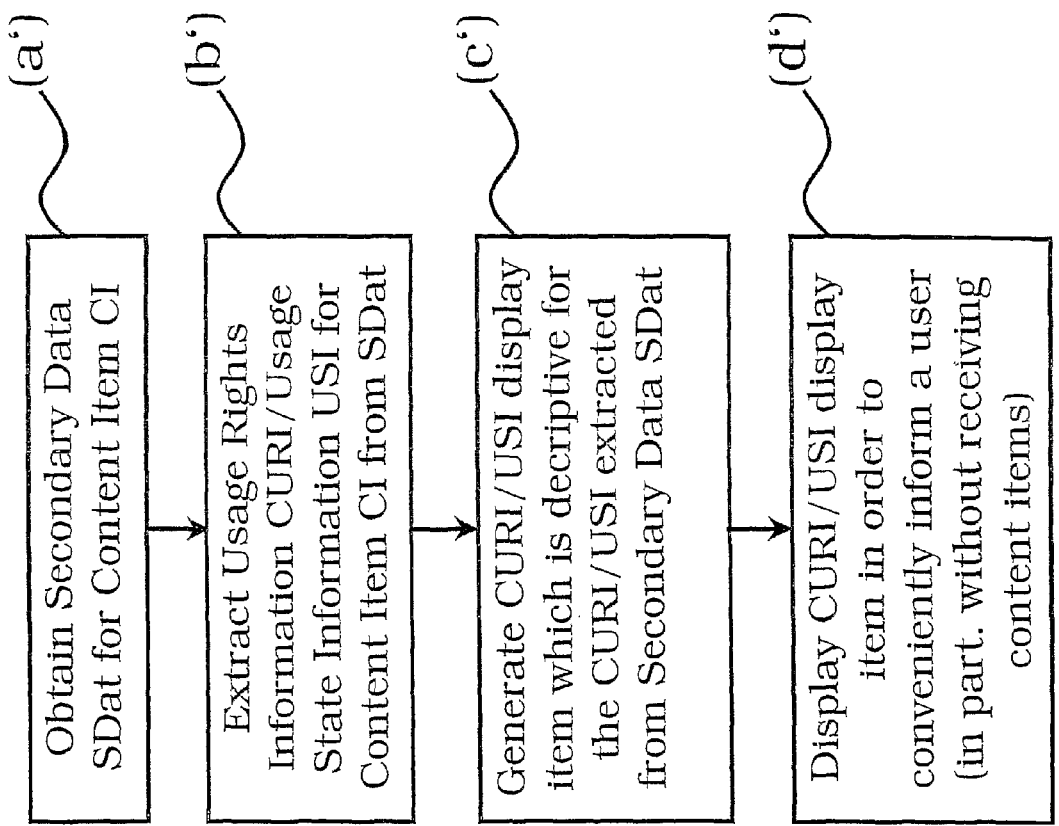

FIG. 9 is a schematical block diagram, which elucidates some basic aspects of an embodiment of the present invention.

Figure 10:
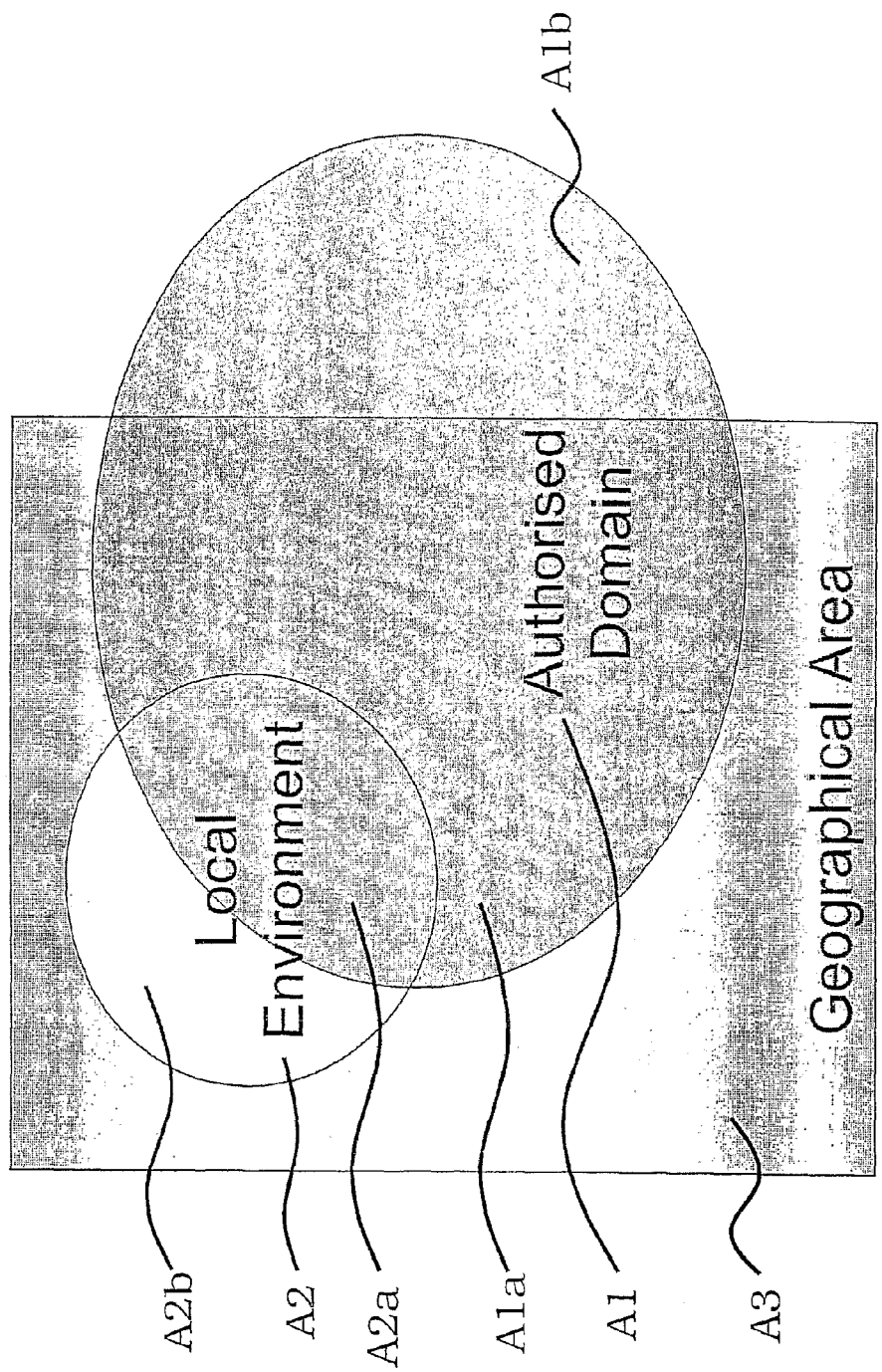

FIG. 10 is a schematical diagram illustrating the concepts of the various methods of defining the location of any device that includes the functionality of the CPCM system for which said content usage rights information CURI and/or usage state information USI is able to signal one or more propagation restrictions.

Figure 11:
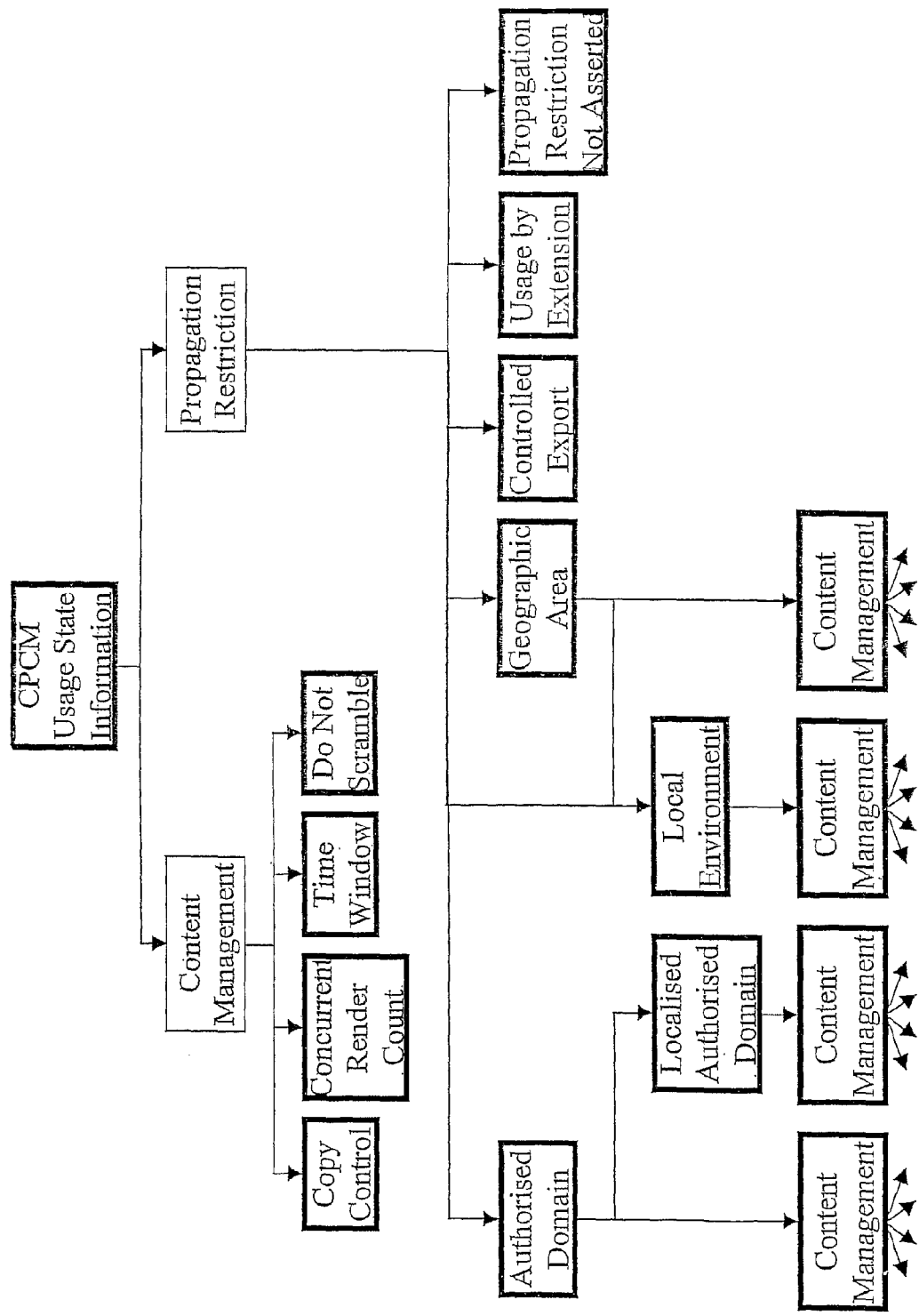
Figure 11A:
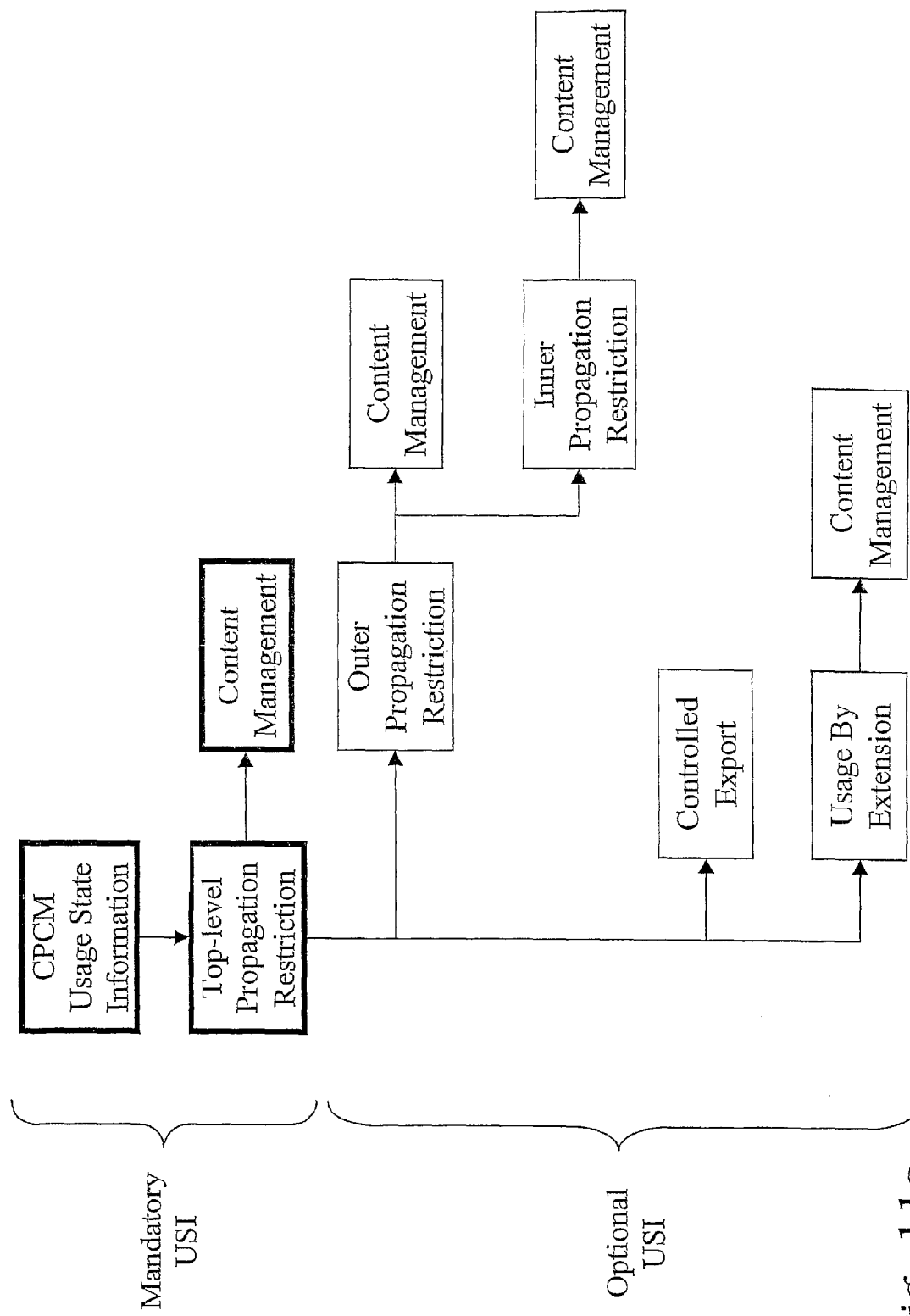

FIG. 11, 11a are schematical diagrams illustrating the hierarchy and structure of the content usage rights information CURI and/or the respective usage state information USI as proposed. The elements outlined in bold represent the actual usage properties that can be specified for any content item.

Figure 12:
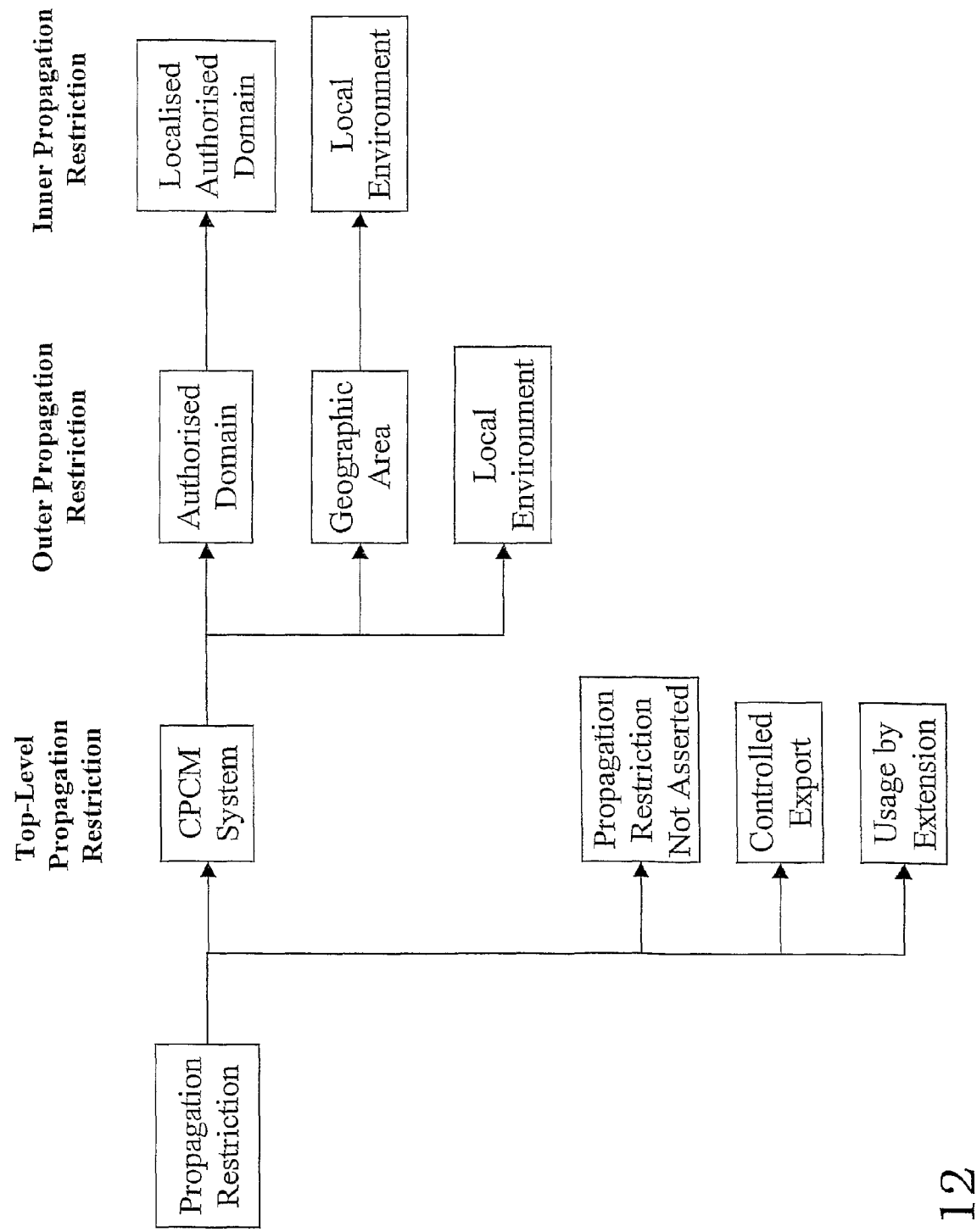
Figure 13:
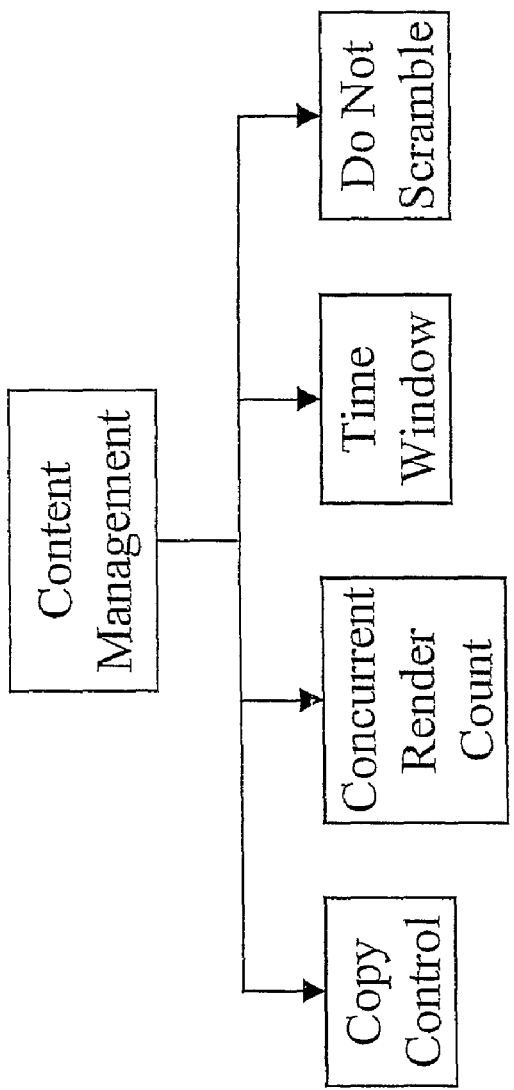

FIG. 12, 13 are a schematical diagrams illustrating the hierarchy and structure particularly of the propagation restriction usage rules and USI.

FIG. 8 is a flow chart describing some basic aspect of an embodiment of the inventive method for providing content. In a first process (a) primary data PDat are obtained as or being representative for a content item CI to be provided as or being representative for a pre-form thereof. Then, in a second process (b) content usage rights information CURI and/or usage state information USI which is descriptive for usage rights UR or the usage state US with respect to the content item CI to be provided are obtained, In a third process (c) said content usage rights information CURI and/or usage state information USI or a derivative thereof are embedded into said primary data PDat or a derivative thereof. Thereby, secondary data SDat are generated as or being representative for a content item CI to be provided. Finally, (d) said secondary data SDat or a derivative thereof are provided and/or presented as said content item CI together with the embedded content usage rights information CURI and/or usage state information USI.

FIG. 9 is a flow chart describing a basic aspect of another embodiment of the inventive method for providing content. In a first process (a') secondary data SDat are obtained which comprise a content item CI as such as well as the respective content usage rights information CURI and/or the respective usage state information USI for the content item CI. In a following process (b') said content usage rights information CURI and/or the respective usage state information USI for the content item CI is extracted, in particular without receiving or evaluating the content item as such. Then in a following process (c') a CURI/USI display item is generated from said secondary data SDat which is representative for said content usage rights information CURI and/or the respective usage state information USI for the content item CI. Finally, in a process (d') said CURI/USI display item is display thereby informing a user with respect to said content usage rights information CURI and/or the respective usage state information USI for the content item CI even without evaluating said content item as such thereby achieving a high degree of user friendliness.

Figure 1:
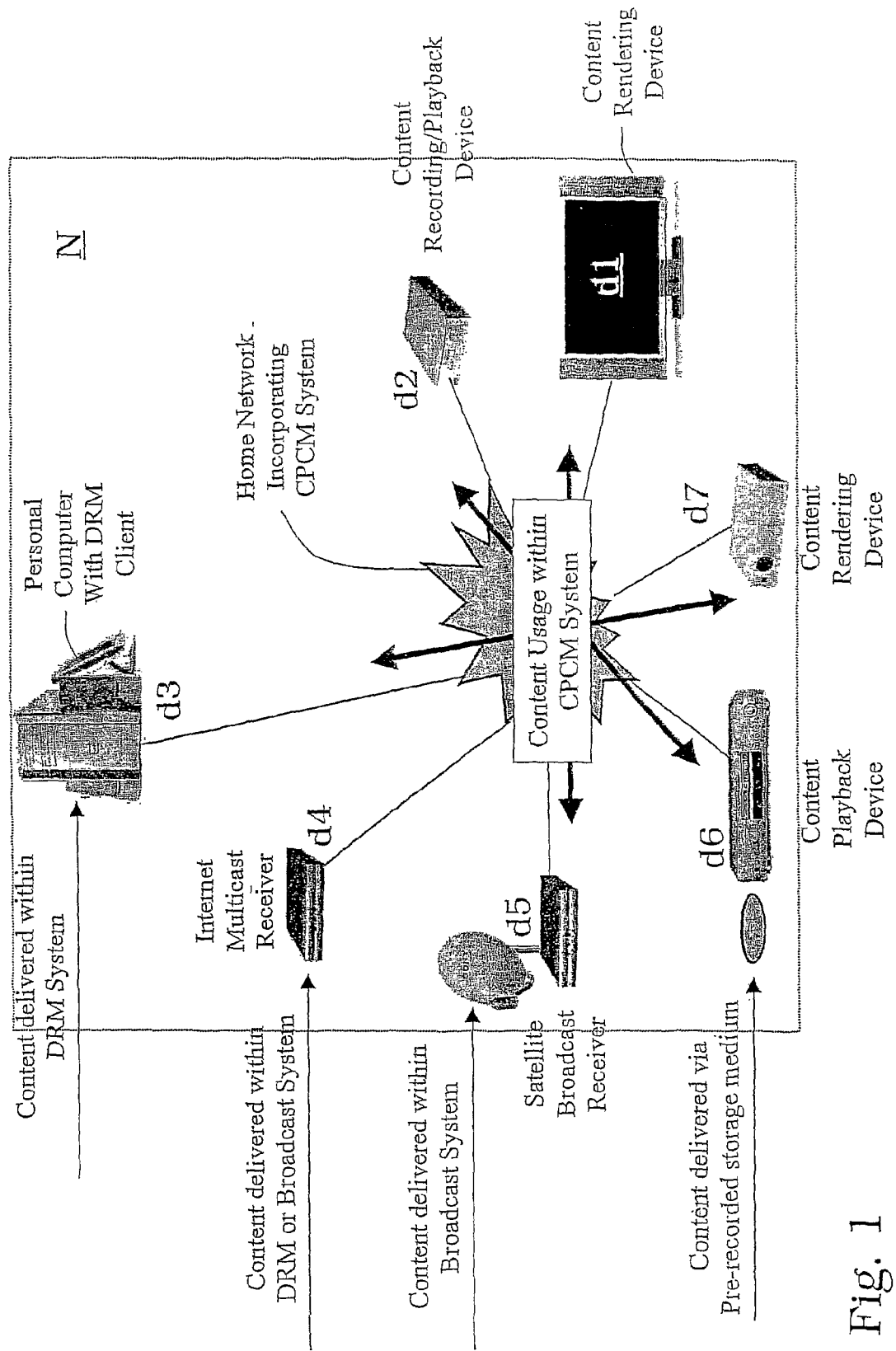
FIG. 1 is a schematical diagram and elucidates an example of a consumer environment for audio-visual content acquisition and usage to which the present invention may be applied.

FIG. 1 is a schematical diagram illustrating an example of a consumer environment for audio-video content acquisition and usage to which the present invention can be applied. Within a network N certain devices d1 to d7 which have audio and/or video capabilities and/or functionalities are connected with respect to each other. Devices d1 and d7 have content rendering and/or display capabilities and/or functionalities and may receive respective content items CI from devices d2 to d6. Devices d3 to d6 may receive respective content items CI or primary and/or secondary data PDat and SDat, respectively, thereof e.g. from external sources. Device d2 has content recording and content playback capabilities.

Protected audio-video content can reach the consumer via many different channels, each having its own kind of protection system and content usage rules.

FIG. 10 is a schematical diagram illustrating the concepts of the various methods of defining the location of any device that includes the functionality of the CPCM system for which said content usage rights information CURI and/or usage state information USI is able to signal one or more propagation restrictions.

Area A1 is the authorized domain of a user or household, to which devices including the functionality of the CPCM system may be associated.

Area A2 is the immediate vicinity around any device including the functionality of the CPCM system, or any content item within the CPCM system, hence area A2 is referred to as the local environment.

Area A2a corresponds to the set of devices including the functionality of the CPCM system that are in the immediate vicinity and that belong to the same authorized domain, hence area A2a is referred to as the localized authorized domain. Area A2a is a subset of both area A1, the authorized domain, and area A2, the local environment.

Area A2b corresponds to the set of devices including the functionality of the CPCM system that are in the immediate vicinity but that either belong to a different authorized domain or that belong to no authorized domain, or are not equipped with the authorized domain membership part of the CPCM system functionality.

Area A1a corresponds to the set of devices including the functionality of the CPCM system in the authorized domain which are located within said geographic area A3, for example at the user's or household's main residence in the home region.

Area A1b corresponds to the set of devices including the functionality of the CPCM system in the authorized domain which are located outside said geographic area A3, for example at the user's or household's holiday or second home in a different region.

Area A3 corresponds to any geographic area or region within which it may be necessary to constrain the propagation of certain types of content.

Area A1, the authorized domain, is inherently orthogonal and managed independently to area A2, the local environment, and area A3, the geographic area. Area A3 is inherently a subset of area A3.

Due to the nature and inter-relationship of these different classes of area, it is feasible to define the hierarchy of outer and inner content propagation restrictions as described previously and the corresponding flexibility of specifying content usage rights information CURI and/or the respective usage state information USI with respect to these different areas.

FIG. 11 is a schematical diagram illustrating the hierarchy and structure of the content usage rights information CURI and/or the respective usage state information USI as proposed. The elements outlined in bold represent the actual usage properties that can be specified for any content item.

FIG. 12 is a schematical diagram illustrating the hierarchy and structure particularly of the propagation restriction usage rules and USI.

FIG. 1 shows a typical consumer environment consisting of a network of AV devices able to receive protected content from various channels.

In the realm of DRM, several Rights Expression Languages (REL) are established, even standardized, in the prior art, e.g. XrML [6], ODRL [7]. In a web-based computing environment it is advantageous to deploy such RELs based on XML, as much of the processing tools or software is generally already built into the devices (networked PC, browser). Also, the relatively inefficient data formats of XML-based RELs are not an issue when a single item of content is being delivered to a consumer, for example within an internet DRM system.

In a broadcast environment, however, many, even hundreds of services are available to the consumer in parallel. It is desirable to inform the user, via his receiving equipment, of any eventual content usage restrictions, or rights associated with content items, for currently available content, or scheduled future content in advance, for example as icons accompanying services generally listed in an on-screen EPG.

To deploy such an XML-based REL in a broadcast environment has the following disadvantages:
  A relatively large proportion of the available data transmission capacity would be needed.
  Many types of broadcast receiver are not equipped with functions and software generally needed for internet or web browser based operations, or the interpretation of XML format data.

Therefore it is the goal of the present invention to provide a method for carrying such USI in broadcast content streams in an efficient manner, and one more suitable for all types of broadcast receiver. This method can also be used to carry such USI within a CPCM system for the consumer environment, i.e. among AV storage, processing, and rendering devices in the home network.

An additional advantage of the present invention is that the method of embedding USI in an item of content provides a convenient tool for the interoperable exchange of content between different DRM or content protection systems. This is due to the fact that no additional data is required to be passed between such systems, apart from the item of content itself, which contains all necessary information (USI and auxiliary data) pertaining to its allowed usage in the compliant domain.

The method is summarized as providing:
  Broadcast-friendly format for the carriage of content USI, i.e. within MPEG-2 Transport Streams, or MPEG-2 Program Streams, which can be utilized directly by broadcasters or content aggregators to signal USI for both currently available channels and transmissions in the future, in a consumer-side CPCM system.
  Broadcast-friendly format for the carriage of content USI, i.e. within MPEG-2 Transport Streams, or MPEG-2 Program Streams, which can be utilized by content recording and/or playback devices in the consumer environment to convert from another protection system's USI format to the a common CPCM system USI format.
  Tools to convert XML-based REL USI to the proposed broadcast-friendly format for insertion into the broadcast MPEG-2 Transport Stream, at the content aggregation or broadcast head-end equipment.
  Tools to convert XML-based REL USI to the proposed broadcast-friendly format for a DRM client software at the consumer side which ingests protected content into a broadcast-oriented consumer CPCM system.

MPEG IPMP [1] is an ISO/IEC Standard defining a DRM framework for MPEG content. It includes the Extensible Rights Markup Language (XrML) [6] as the Rights Expression Language to provide the complete set of possible Usage Rules (UR) for IPMP content. However, this standard is too feature-rich and complicated to be used for the practical realization of an interoperable DRM framework encompassing all classes of consumer audio-visual devices. Indeed, an XML-based language is not suitable for the complete spectrum of consumer entertainment devices, due to the memory and processing resources necessary to work with it.

The Open Digital Rights Language (ODRL) [7] does indeed provide a simpler set of UR than XrML, but is still much too powerful for a common baseline approach for CPCM in the consumer environment.

Both XrML and ODRL are providing full DRM rights expression tools, covering all types of media, and commercial transactions and billing, for example. A CPCM system does not require such functionality and can omit such features from its pre-defined set of USI.

The TV-Anytime Forum (TVAF) recently published a specification for Rights Management and Protection for broadcast content [4]. RMPI and RMPI-MB are applicable to the same realm as the current invention, but the TVA/RMPI is not fully suitable for horizontal market interoperable CPCM frameworks and does not include all necessary tools required for such. Apart from that, some aspects also imply a greater burden of implementation for manufacturers of compliant consumer equipment. The present invention presents an alternative scheme to TVA RMPI, relying more on a fixed CPCM framework and regime for content protection management, thus providing a simpler and clearer framework for the consumer.

CPCM USI Format

The format suitable for broadcast and home network CPCM systems is some form of structured binary coded data that can be embedded repeatedly within the content data file or stream. The pre-defined structure and coding means that many of the often extensive header tags necessary with XML-based usage rule coding schemes can be omitted. Each coded usage rule setting that is translated then becomes a pre-defined 8-bit binary value, instead of text-form delimiters. Of course, eventual argument fields might not be able to be compressed.

Figure 2:
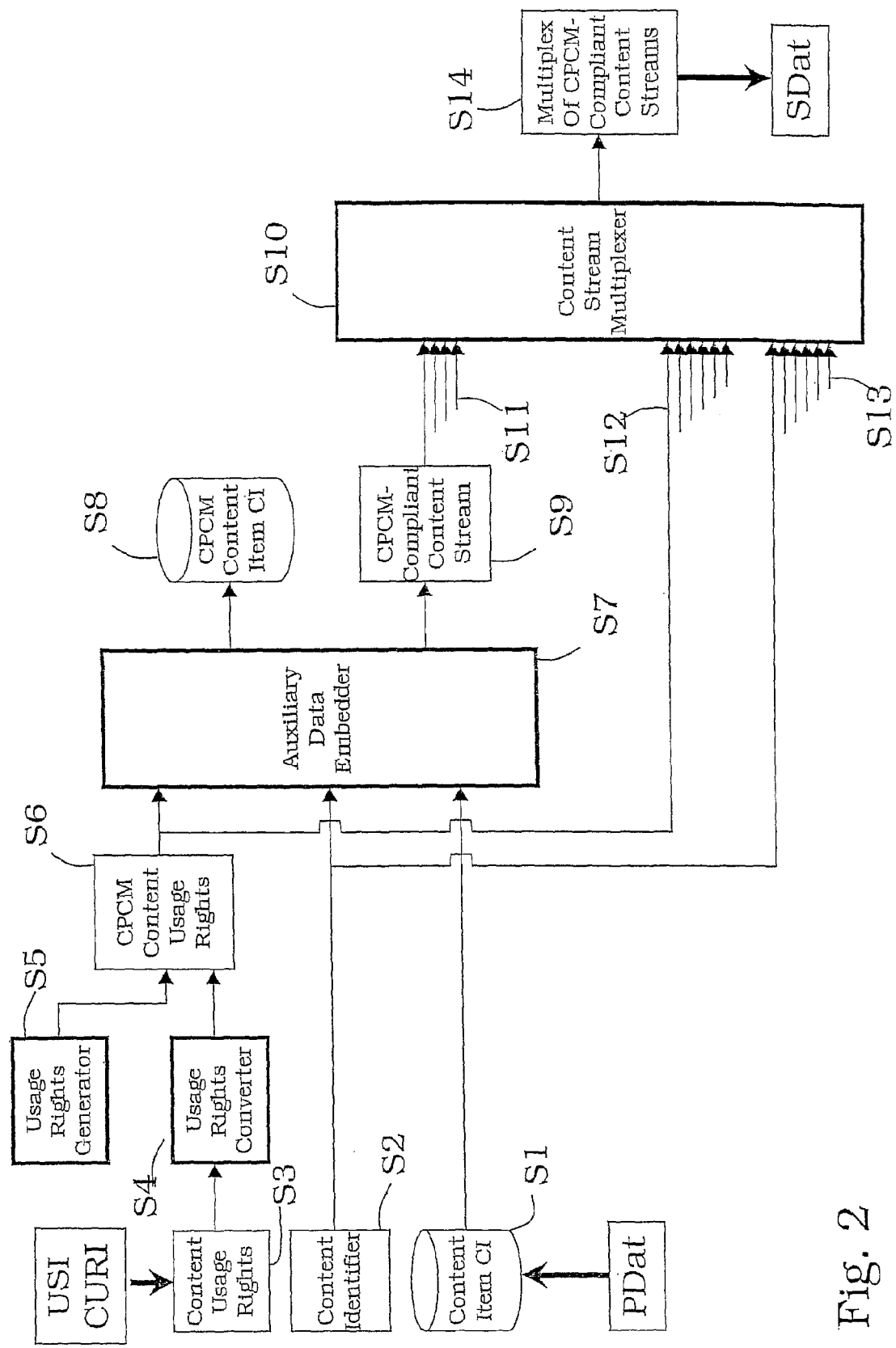
FIG. 2 is a schematical block diagram of a process for the generation of CPCM usage rights settings and CPCM content streams as a preferred embodiment of the present invention.

FIG. 2 shows the general process of generating an AV content item or transport or broadcast stream of content for the CPCM system.

Process 1 yields the AV content to be managed and protected by the CPCM System. In the prior art, this content can have a content identifier obtained by process 2 and content usage rights associated with it and obtained by process 3, but often provided separately from the content item itself, in a separate file, or stored in a database.

In process 4 the usage rights converter involves the parsing and generation of the equivalent usage rights according to the CPCM System. Its output is the binary coded set of data corresponding to the CPCM System and broadcast friendly usage rights or USI data according to process 6. The USI data can also be generated directly by a usage rights generator tool or process 5.

Process 7, the auxiliary data embedder inserts the CPCM content usage rights, or USI, into the CPCM compliant content item CI stored data file according to process 8, or the CPCM compliant content stream according to process 9, depending on the application at hand. One feature of the invention is that such USI data is repeated regularly within the CPCM Content Item or CPCM compliant content stream, to facilitate the quick and correct interpretation of the content usage rights when the receiving device of such content performs random access to the content, for example during live broadcast while hopping channels on the broadcast receiver.

As is common with digital broadcast systems, many such individual content streams, or services, can be multiplexed (process 11) to form a content stream containing several services. The service multiplexer (process 10) collects the content identifiers (process 13) USI data (process 12) for all services to be carried in the multiplex. It can also collect this information relating to content scheduled in the future, in order to provide advance information about the usage rights in advance. Process 14 yields the resulting multiplex of content services including all USI for the services contained and scheduled content.

Figure 3:
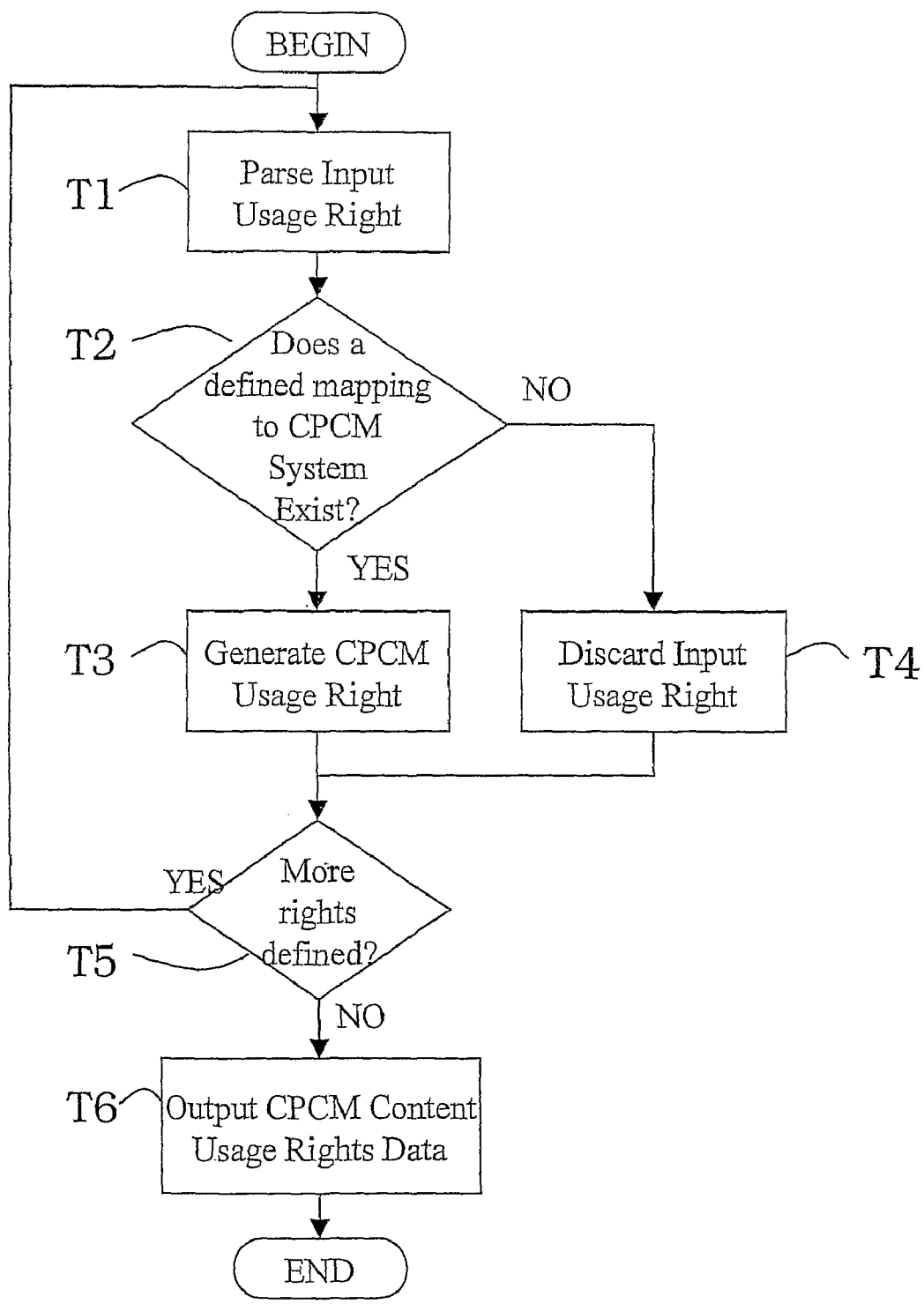
FIG. 3 is a flow chart, which describes processes which may take place in a preferred embodiment of the present invention and in particular in a usage rights converter.

FIG. 3 shows the flow diagram of process 4 in the previous diagram, for the case when the input usage rights are in the form of a text format, for example one of the markup languages established in the prior art.

Each usage right, usually encoded with a "tag" section, is interpreted, and the equivalent usage right is generated on the basis of pre-defined mappings from the input format. Usage rights for which no mapping is defined in the CPCM USI are ignored.

When all input usage rights have been parsed and converted, the output CPCM usage rights data, or USI, is generated. This is input to the Auxiliary Data Embedder, which combines the USI with the content as described previously.

The Auxiliary Data Embedder could also consist of a multiplexer, which combines several content items, or streams, into a multiplexed content stream, as commonly used in broadcast systems, for example DVB.

The Auxiliary Data Embedder could also embed USI about content items available in the future.

The USI could form another component of already defined auxiliary data defined in the broadcast system, for example the Service Information [8] in the case of DVB. Such a preferred embodiment is described later.

One advantage of the present invention becomes evident when the decoding process in the consumer environment is considered, both at the point of first acquisition of CPCM complaint protected content, and after storage (if allowed by the USI) and subsequent retrieval by any rendering device in the home network. Because the USI has already been converted to the CPCM System compliant format, no renewed interaction with the originating DRM or CA system is necessary to establish the usage rights for that content. All CPCM devices accessing the content are able to process the content and abide by the usage rules because they are stored and embedded within the content file or stream in a format easily processable by those devices, in the DVB example, as an additional descriptor within the service's or content item's associated SI.

Another feature of the invention is the display of icons indicating the allowed or disallowed functionality with respect to the received content on the rendering device's graphical user interface, allowing the user to know in advance how he is able to use that content.

A typical feature of an EPG function is to show information about programming content, or events, in the future. In the same way, the accompanying USI in the SI can be used to indicate to the user his available options for that content item available in the future, alternatively the user interface could blank out functionality that is apparently disallowed by the USI.

Optimized, Minimal Set of USI

This section provides a definition of the set of Usage Rules (UR) for audio-visual content in the consumer environment, and methods of communication of this information with the associated content, both prior to content reception in a consumer's domain (in the delivery channel), and for the subsequent life of the content in the domain (on all devices which can use the content, networked devices in the home(s), also in the consumer's private vehicle(s) and on mobile handheld devices.

URs are communicated within the CPCM Framework by encoding them in a pre-defined scheme. Such data is referred to as "Usage State Information" (USI).

The complete set of Usage Rules for a CPCM Framework is defined here. The URs are defined as a set of Properties applied to an item of content. This set is deemed to be complete in terms of the minimum set of necessary controls with audio-visual content functionality in the consumer environment.

CPCM Framework Content Usage Rules (UR)

According to the invention, there are two kinds of UR Property, and hence derived Usage State Information (USI)—Mandatory and Assertive.

Mandatory USI: Any item of CPCM content must always have one of the Mandatory USI field's states applied to it.

Assertive USI: The presence of Assertive USI implies that the associated restriction/concession is being imposed/granted. If a particular Assertive USI field is not present with any item of content then that restriction/concession is not imposed/granted.

Assertive USI is orthogonal to the Mandatory USI, i.e. each Assertive USI field can be applied with any of the Mandatory USI field states.

In the case of content Copy, the generated new instance of content generally inherits the non-Copy USI of the original instance.

Each UR Property is described in the following sub-sections.

Copy Control

A simple model for copy control USI is already largely established in the prior art. It is adopted as forming one component of the CPCM Framework UR. This provides the options for marking content in one of five states:

Copy Never Zero Retention (CNZR)—no copy of such content is allowed, nor is a secure non user-accessible temporary buffer copy allowed for the purpose of pausing the playback.

Copy Never (CN)—no copy of such content is allowed, except for a secure non user-accessible temporary buffer copy for the purpose of pausing the playback.

Copy Once (C1)—exactly one single copy of the content can be created.

Copy One Generation (C1G)—the content can be copied repeatedly, but each copy is then marked "Copy No More". An optional argument for the C1G state is the maximum number of copy instances allowed. In an actual CPCM System this could be left variable, to be set explicitly for each item of content, or not needed to be set and a global maximum value is enforced in that CPCM system.

Copy No More (CNM)—see above; no copies are allowed.

Copy Control Not Asserted (CCNA)—no restriction is placed upon copying of the content.

A Copy action on content bearing either the C1 or the C1G state produces a new instance of that content bearing the CNM state.

In the CPCM Framework, the Copy Control USI Property is Mandatory USI.

C=1 of {CNZR, CN, C1, C1G, CNM, CCNA}

Concurrent Render Count

Some content providers maintain the commercial requirement to be able to restrict the number of concurrent renderings of an item of content, e.g. the number of display devices rendering that content in the home. Thus the CPCM Framework includes this ability in the USI.

View/Consume+Count (Count=0 for non-viewable)

In the CPCM Framework, the USI Restrict Concurrent Rendering (RCR) is optional USI, and is always augmented by the maximum count of concurrent renderings allowed. If the RCR Property is not present in the USI then that content is viewable on any number of rendering devices (but also subject to the eventual propagation restriction specified in the USI, alternatively up to a generally valid maximum number of concurrent renderings which might be specified).

Alternatively, the RCR Property could have a parameter defined such as "restriction not asserted". In this case RCR could also be a mandatory USI property.

$$V=RCR+Count, \text{ or}$$

$$V=RCR+Not\ Asserted/Count$$

Time-Based Restriction of Content Usage

There is scope for time-based business models for content usage, for example online rental. The CPCM Framework thus includes USI to allow content usage within a specified time window only.

The Time-Based Restriction (TBR) UR is set by applying one or both of the "FROM" and "UNTIL" parameters in the TBR USI.

An alternative time-based UR is based on usage within a relative time after the content is received, by applying the "FOR" parameter.

The TBR UR could be assertive, or alternatively could be mandatory, if the parameter "restriction not asserted" is also defined in the USI.

$$T=1 \text{ or both of \{FROM+date/time(absolute); UNTIL+} \\ \text{date/time(absolute)\} or \{FOR+data/time(dura-} \\ \text{tion) or Not Asserted\}}$$

Disable Content Scrambling

Some content providers require, as a matter of principle or by regulation, to not protect their content by means of cryptographic tools, i.e. scrambling. The CPCM Framework includes such a USI tool, the "Do Not Scramble" USI (DNSC). This is optional USI. If not set then the content is scrambled by default within the CPCM Framework.

$$S=DNSC$$

Propagation Restriction

Some content providers maintain the commercial requirement to restrict the propagation of valuable content to within a certain realm, once the content has been acquired by a consumer.

The CPCM Framework offers a UR to characterize this property in content. The following usage properties are valid for the Propagation Restriction UR/USI:

Restrict to Content Protection and Copy Management System (RTCPCM)—an item of content with this state applied is to remain protected by the CPCM system, being the default propagation restriction setting for content to be protected.

Restrict to Authorized Domain (RTAD)—an item of content with this state applied will not be allowed to propagate beyond the set of CPCM-compliant equipment belonging to the user receiving the content, thus allowing the user to use the content at home, access it from a remote location, for example a second home or from a mobile handset.

Restrict to Localized Authorized Domain (RTLAD)—an item of content with this state applied will not be allowed to propagate by electronic transfer beyond the close vicinity of the point at which that content entered the consumer environment, within the respective Authorized Domain (AD). In practical terms this could mean the Local Area Network (LAN) in which the receiving device is connected, for example in the user's main dwelling, i.e. excluding live transfer to the secondary dwelling or to a mobile device.

Restrict to Geographic Area (RTGA)—an item of content with this state applied is not intended to propagate by electronic transfer outside the geographic area indicated.

Restrict to Local Environment (RTLE)—an item of content with this state applied will not be allowed to propagate by electronic transfer beyond the close vicinity of the point at which that content entered the consumer environment. In practical terms this could mean the Local Area Network (LAN) in which the receiving device is connected, for example in the user's main dwelling, i.e. excluding live transfer to the secondary dwelling or to a mobile device.

Controlled Export (CE)—an item of content can be either allowed or disallowed to propagate to a different protection system that is not implicitly and universally trusted by the CPCM system, Usage by CPCM extension (EXT)—an item of content with this state applied is provided with distinct content management usage properties which apply within the realms of some known system which provides content protection and copy management functionality as an extension to the CPCM system, Propagation Restriction Not Asserted (PRNA)—the item of content can be redistributed also outside of the CPCM Framework. In practical terms this would be the equivalent of allowing uncontrolled sharing of the content in unprotected form, like the present-day P2P sharing scenario.

In the CPCM Framework, the USI Propagation Restriction Property is Assertive USI. If no Propagation Restriction Property is given in a content item's USI, then that content shall be protected by the CPCM system but not restricted with regards to its movement within the CPCM system, subject to the settings of the content management USI for that content.

Alternatively, content within the CPCM framework can carry USI for various propagation restrictions, according to the aforementioned rules, whereby at least one default propagation restriction is given.

$$R=0 \text{ or } 1 \text{ to } n \text{ of \{RTAD, RTLAD, RTGA, RTLE, CE,} \\ \text{EXT, PRNA\} according to the aforementioned} \\ \text{hierarchy}$$

Preferred Embodiments for USI

The prime area for application of the invention is with audio-visual content which is carried or stored in an MPEG-2 Transport Stream [5]. Content disseminated by digital television broadcast is already in this form. Some new forms of content delivery will also use the same format, e.g. video-on-demand over Internet Protocol (IP) services. It can also be applied to MPEG-2 Program Stream format, currently used for example for audio-visual content stored on a Digital Versatile Disk (DVD). The invention thus also allows seamless perpetuation of content URs when content might be converted between these two formats.

Currently digital television services carry MPEG-2 based audio and video content. In the future there will be increasing scope for other content formats, for example MPEG-4 AVC (video) and AAC (audio), but these services also use MPEG-2 Transport Streams as the method of carriage.

Embodiments Using MPEG-2 Systems Section Syntax

According to the present invention, USI is carried in the MPEG-2 Transport Stream along with the content whose URs the USI describes. It is however feasible that the same USI coding method be used to carry the USI separately from the content itself, for example within a Content License (CL), a secure set of data associated with the content in a content protection or DRM system.

The following table shows the generic syntax of USI, where the first set of content management usage properties specifies the USI for the content throughout the CPCM system. This need not be present if at least one propagation restriction entry follows, containing the respective content management USI. If the CPCM system-wide content management USI is present, then additional content management USI can be specified after each of the eventual propagation restriction entries. This is how different usage rules can be set for different realms of the CPCM system.

| Syntax | No. of bits | Identifier |
|---|---|---|
| generic_usage_state_information_coding_syntax( ){ | | |
|   top_level_propagation_restriction_usage_property | 8 | uimsbf |
|   top_level_content_management_loop_length | 8 | uimsbf |
|   for (i=0;i<N;i++){ | | |
|     content_management_usage_property | | |
|   } | | |
|   outer_propagation_restriction_loop_length | 8 | uimsbf |
|   for (i=0;i<M;i++){ | | |
|     outer_propagation_restriction_usage_property | | |
|     outer_content_management_loop_length | 8 | uimsbf |
|     for (j=0;j<P;j++){ | | |
|       outer_content_management_usage_property | | |
|     } | | |
|     inner_propagation_restriction_length | 8 | uimsbf |
|     inner_propagation_restriction_usage_property | 8 | uimsbf |
|     inner_content_management_loop_length | 8 | uimsbf |
|     for (j=0;j<Q;j++){ | | |
|       inner_content_management_usage_property | | |
|     } | | |
|   } | | |
| } | | |

There could be more than one GA realm specified, but there should only ever be one LE and/or one RTAD and/or one RTLAD propagation restriction set of USI specified.

Many combinations of realms and respective content management USI settings will not make sense, but the coding rules described earlier ensure that illogical combinations are avoided.

In general it can be expected, for example, that there should never be more restrictive content management rules specified for the smaller propagation realm, e.g. for the LE versus the GA, or for the RTLAD versus the AD.

Tab. 1 shows the generic preferred coding of the set of usage properties, parameters and arguments. This is applicable to both of the embodiments using MPEG-2 Systems (namely DVB SI, and copyright descriptor). N represents the number of usage state information properties contained in the instance applied to an item of content. Tab. 1 is also a schema for a decoder.

Tab. 2 shows the syntax for each usage state information property, and the respective usage parameters and arguments.

Protection of USI against manipulation: USI table contains a keyed hash of the USI information. In the case of encrypted content, this keyed hash shall preferably be encrypted using the content key.

also in CTA streams

The USI is to be repeated regularly within the content stream. This has two advantages over the situation where USI is communicated only once, for example at the start of the content stream:

Random access to the content by a consumer device is enabled, for example to enable the quick acquisition of the usage rules after the broadcast stream has been acquired during ongoing transmission (during TV channel hopping).

Additional security of the USI, as potentially every repetition of the USI would have to be manipulated in order to circumvent the URs conveyed.

Thus the usage state information is preferably included in data sections that are required to be repeated regularly in the content stream to which the information is associated.

Embodiment with DVB Service Information (SI)

DVB SI [8] defines a syntax for carrying data related to the audio-visual services carried in the DVB Transport Stream.

In this embodiment a new SI descriptor is defined, preferably called the "usage state information descriptor", and is assigned a descriptor tag value.

The usage state information descriptor is carried preferably in the Event Information Table (EIT), indicating the usage state information for that event. The usage state information descriptor can be carried in all types of EIT, thus allowing the advanced indication of usage state information for future events using the same method of communication.

The usage state information descriptor is preferably duplicated in the Service Description Table (SDT), and either alternatively or in addition, in the Program Map Table (PMT), indicating the usage state information of the currently running event for that service.

Tab. 3 shows the preferred syntax of the usage state information descriptor in DVB SI. The previously described generic coding syntax is applied to the DVB SI descriptor structure.

Embodiment with ATSC Program and System Information Protocol (PSIP)

The invention can also be applied to ATSC [9] systems. Here, similarly to how the invention is applied to DVB systems, a new descriptor is defined to carry usage state information for the associated content.

Embodiment with MPEG Copyright Descriptor

MPEG-2 Systems [5] specifies the "copyright descriptor" as a tool for identifying associating a particular registration authority and content identifier to the content.

This preferred embodiment of the invention foresees the establishment of a new registration authority that might also define a corresponding CPCM or DRM system that would apply the copyright descriptor to associate the content with UR and corresponding USI as disclosed by the invention.

The "additional_copyright_info" field in the copyright descriptor is expanded to contain the coding of USI according to the present invention.

Tab. 4 shows the preferred syntax of the usage state information descriptor when applied to the MPEG-2 Systems copyright descriptor. The previously described generic coding syntax is applied to the copyright descriptor structure.

The copyright descriptor with usage state information according to the present invention can be applied to content carried in both streams defined in [5]:

MPEG-2 Transport Stream, where such copyright descriptor is inserted into every instance of the Transport Stream Program Map Section, as a program_info descriptor, in order to convey the usage rights of the associated content.

MPEG-2 Program Stream, where such copyright descriptor is inserted into every instance of the Program Stream Map, as a program_stream_info descriptor, in order to convey the usage rights of the associated content.

Embodiment Using an XML Schema

It is feasible to define an XML schema code fur CURML which indeed does have the same scope as the binary method of coding USI. Such a schema may be useful in certain content exchange environments.

ASPECTS OF THE INVENTION

The present invention covers the following aspects.

Method for the communication of audio/visual content usage rules in a content protection copy management system in a consumer environment.

Method to apply a practical, complete and flexible set of content usage rules within a CPCM system in the consumer environment, whereby:

Such usage rules settings are coded in binary form in order to achieve greater efficiency.

Such usage rules settings are inserted or embedded into the content item or stream to be protected.

Such usage rules settings are inserted or embedded in a similar format to other auxiliary data accompanying the content item or stream.

Such usage rules settings are repeated regularly within the content item or stream in order to facilitate quick acquisition of the rules when random access to the content item is exercised.

Method to convert content usage rule settings from one system (in particular any XML-based coding scheme) to an efficient coding method suitable for broadcast systems and a common CPCM system for the consumer environment.

Method of communicating the availability or non-availability of certain content processing functions in a graphical user interface according to the usage rule settings for that content, be that item of content already available for rendering, or one that will be available in the future.

Definition of Content Management and Propagation Restriction UR and USI.

Definition of a hierarchy of Propagation Restriction UR and USI that allows the flexible and efficient coding of all required content usage models.

Definition of Mandatory and Assertive UR and USI.

Definition of each of the UR properties—NB. Copy control USI, also known as Copy Control Information (CCI), is largely prior art; the same applies for time-based restriction to content usage. But the nature of the whole set of UR and USI is an important aspect of the invention.

Device or software which interprets said USI to derive compliant behavior for the respective content items.

Device or software which generates said USI in order to indicate or enforce the desired usage rules for the respective content items.

Tool to convert between the different USI encoding methods disclosed herein, for example when the XML schema is used during content authoring, to convert this USI to the SI table format.

CPCM or DRM system which implements the present UR and/or USI framework to signal and maintain content usage rights in the consumer environment.

Method of application of the invention to content carried in MPEG-2 Transport Stream.

Method of application of the invention to content carried in MPEG-2 Program Stream Use of MPEG-2 Systems copyright descriptor to associate new RA and CRID, to carry USI with the content, providing a means for devices to acquire the URs for the content.

Definition of syntax for USI for use in DVB systems.

Definition of syntax for USI for use in ATSC systems.

Method whereby the USI is repeated regularly within the content stream, for the purposes of enhancing security and allowing a consumer device to randomly access the content, for example to quickly acquire the usage rules after the broadcast stream has been acquired (during TV channel hopping).

Method of XML-based coding of UR, resulting in an alternative encoding method which may be useful for certain applications, e.g. an XML schema.

Method for signaling UR for other content carried in the same delivery system, by using the same USI in program information, e.g. TV schedule data.

Method for signaling usage rights of content within a CPCM or DRM Content License.

REFERENCES

[1] ISO/IEC1318-11 IPMP on MPEG-2 Systems
[2] Background Article on DVB CPCM: http://www.dvb.org/documents/newsletters/DVB-SCENE-05.pdf
[3] DVB World Conference 2004, Dublin, Presentation on DVB CPCM
[4] TV-Anytime Forum TC211r3 Specification for the Semantics of TV-Anytime Rights Management and Protection Information for Micro-Broadcast: ftp://tva:tva@ftp.bbc.co.uk/pub/Plenary/TV211r4.zip
[5] ISO/IEC13818-1 MPEG-2 Systems
[6] Extensible Rights Markup Language (XrML), info at: http://www.xrml.org/get_XrML.asp
[7] Open Digital Rights Language (ODRL) Specification Version 1.1: http://www.w3.org/TR/odr1/
[8] ETSI EN 300 468—Digital Video Broadcast (DVB); Specification for Service Information in DVB Systems
[9] ATSC Standard A/65B: Program and System Information Protocol for Terrestrial Broadcast and Cable

| Abbreviations | |
| --- | --- |
| AD | Authorized Domain |
| CPCM | Content Protection and Copy Management |
| DRM | Digital Rights Management |

-continued

| Abbreviations | |
|---|---|
| DVB | Digital Video Broadcast |
| EPG | Electronic Program Guide |
| GA | Geographic Area |
| IP | Internet Protocol |
| LAD | Localized AD |
| LAN | Local Area Network |
| LE | Local Environment |
| RMPI | (TV-Anytime) Rights Management and Protection Information |
| SI | Service Information |
| TVA | TV-Anytime |
| TVAF | TV-Anytime Forum |
| UR | (Content) Usage Rule(s) |
| USI | Usage State Information |
| WAN | Wide Area Network |

| Reference Symbols | |
|---|---|
| CI | content item |
| CURI | content usage rights information |
| dj | device; j = 1, 2, 3, ... |
| N | network |
| PDat | primary data |
| SDat | secondary data |
| UR | usage right |
| US | usage state |
| USI | usage state information |

The invention claimed is:

1. Method for providing protected audio/video content for a content protection and copy management system based on a network of devices, comprising:
  obtaining primary data (PDat) representative of a content item (CI) to be provided;
  obtaining at least one of content usage rights information (CURI) and usage state information (USI), the content usage rights information (CURI) being descriptive of usage rights (UR) and the usage state information (USI) being descriptive of a usage state (US) with respect to the content item (CI) to be provided;
  embedding at least one of said content usage rights information (CURI), the usage state information (USI), and a derivative thereof into one of said primary data (PDat) and a derivative thereof, thereby generating secondary data (SDat) representative of the content item (CI) to be provided; and
  providing one of said secondary data (SDat) and the derivative thereof as said content item (CI) to be provided with the embedded at least one of the content usage rights information (CURI) and the usage state information (USI),
  wherein at least one of said content usage rights information (CURI) and the usage state information (USI) is embedded repeatedly in a structured binary coded form within one of said primary data (PDat) and said derivative thereof and said repeatedly embedded content usage rights information (CURI) is the same content usage rights information (CURI) throughout said primary data and said derivative thereof and said repeatedly embedded usage state information (USI) is the same usage state information (USI) throughout said primary data and said derivative thereof.

2. Method according to claim 1, wherein the process of embedding at least one of said content usage rights information (CURI), the usage state information (USI), and the derivative thereof into one of said primary data (PDat) and the derivative thereof further includes a sub-process of multiplexing to combine primary data (PDat) of a plurality of content items (CI) into a common multiplexed content stream.

3. Method according to claim 1, wherein at least one of said content usage rights information (CURI) and the usage state information (USI) comprises at least one of a plurality of items of a group of items which consists of copy control including a mandatory propagation restriction, a mandatory concurrent render count, a disable content scrambling, and time-based content usage.

4. Method according to claim 3,
  wherein the usage state information (USI) for copy control is one of a group which consists of:
  "copy never" (CN) according to which no copy of such content is allowed,
  "copy once" (C1) according to which exactly one single copy of the content can be created,
  "copy one generation" (C1G) according to which the content can be copied repeatedly, but each copy is then marked as copy no more,
  "copy no more" (CNM) according to which no copies are allowed, and
  "copy control not asserted" (CCNA) according to which no restriction is placed upon copying of the content.

5. Method according to claim 3,
  wherein the usage state information (USI) for copy control is one of a group which consists of:
  "copy never, zero retention" (CNZR) according to which no copy of such content is allowed, not even a secure temporary non user-accessible copy for the purpose of time-shift buffer,
  "copy never" (CN) according to which no copy of such content is allowed, except for a secure temporary non user-accessible copy for the purpose of time-shift buffer,
  "copy once" (C1) according to which exactly one single copy of the content can be created,
  "copy one generation" (C1G) according to which the content can be copied repeatedly and each copy is marked as copy no more,
  "copy no more" (CNM) according to which no copies are allowed, and
  "copy control not asserted" (CCNA) according to which no restriction is placed upon copying of the content.

6. Method according to claim 3,
  wherein the usage state information (USI) for propagation restriction is one of a group of items which consists of:
  "restrict to content protection and copy management system (CPCM)" (RTCPCM) according to which an item of content is to remain protected by the CPCM system, being a default propagation restriction setting for at least one of content to be protected and propagation is allowed to any other authorized domain (AD),
  "restrict to local environment" (RTLE) according to which an item of content will not be allowed to propagate by electronic transfer beyond a close vicinity of a point at which that content entered a consumer environment, within a respective authorized domain (AD),
  "restrict to authorized domain (AD)" (RTAD) according to which an item of content will not be allowed to propagate beyond a set of CPCM-compliant equipment belonging to a user receiving the content to allow the user to use the content at home and access the content from a remote location, including one of a second home and a mobile handset,
  "usage by CPCM extension" (EXT) according to which an item of content can be provided with distinct content management usage properties within realms of a known system which provides content protection and copy management functionality as an extension to the CPCM system, "controlled export" (CE) according to which an item of content can be one of allowed to propagate and not allowed to propagate to a particular protection system not implicitly and universally trusted by the CPCM system, and "propagation restriction not asserted" (PRNA) according to which an item of content can be redistributed outside of one of the content protection and copyright management system and the CPCM framework.

7. Method according to claim 3, wherein the usage state information (USI) indicates a "concurrent render count" to restrict a number of concurrent renderings of an item of content.

8. Method according to claim 3, wherein the usage state information (USI) indicates "disable content scrambling" to not allow protection of content by cryptographic tools, the cryptographic tools including scrambling.

9. Method according to claim 3, wherein the usage state information (USI) indicates "content scrambling not required" not enforce protection of content by means of cryptographic tools, the cryptographic tools including scrambling.

10. Method according to claim 3, wherein the usage state information (USI) indicates "time-based restriction of content usage" to allow a temporary usage of a given content item only.

11. Method according to claim 3,
wherein one of a first and a usage property information part (UProp) is used in order to indicate one of said usage rights information (CURI) and the usage state information (USI) items, and wherein one of a second and a usage parameter information part (UPar) is used to further specify at least one of the usage rights information (CURI) and the usage state information (USI) item indicated by one of said first and usage purpose information part (UPur).

12. Method according to claim 11,
wherein one of said first and the usage property information part (UProp) is mapped in a one-to-one relationship onto a first finite binary code consisting of four binary bits, and wherein one of said second and the usage parameter information part (UPar) is mapped in a one-to-one relationship onto a second finite binary code consisting of four binary bits.

13. Method according to claim 3, wherein at least one of said usage rights information (CURI) and the usage state information (USI) is embedded within at least one of said usage rights information (CURI) and the usage state information (USI) as an ordered concatenation of bits of a first finite binary code of the respective usage rights information (CURI) and the usage state information (USI) item for one of a first and usage property information part (UProp) and bits of a second finite binary code of a further specification of the respective at least one of the usage rights information (CURI) and the usage state information (USI) item for one of a second and usage parameter information part (UPar).

14. Method according to claim 13, wherein at least one of said usage rights information (CURI) and the usage state information (USI) is formed with respect to said bits of said first finite binary code of the respective at least one of the usage rights information (CURI) and the usage state information (USI) item for one of said first and the usage property information part (UProp) and with respect to said bits of said second finite binary code of the further specification of the respective at least one of usage rights information (CURI) and the usage state information (USI) item for said second or usage parameter information part (UPar) according to the following table:

| Usage_property (Uprop) | Description | Usage_parameter (Upar) | Description | Argument |
|---|---|---|---|---|
| 0000 | Copy Control | 0000 | Copy Never | None |
| | | 0001 | Copy Once | None |
| | | 0010 | Copy One Generation | 8 bits: Maximum number of copies; 0x0 means no restriction; 0x1 is equivalent to Copy Once |
| | | 0011 | Copy No More | None |
| | | 0100 | Copy Control Not Asserted | None |
| | | 0101-1111 | Reserved for future use | None |
| 0001 | Propagation Restriction | 0000 | Restrict to local environment | None |
| | | 0001 | Restrict to authorised domain | None |
| | | 0010 | Restrict to protected realm | None |
| | | 0011 | Propagation restriction not asserted | None |
| | | 0100-1111 | Reserved for future use | None |
| 0010 | Concurrent Render Restriction | 0000 | Reserved | 8 bits: Maximum number of concurrent renderings |
| 0011 | Disable Content Scrambling | 0000 | Reserved | None |
| 0100 | Time-based Usage Restriction | 0000 | From (absolute data/time) | 40 bits: as for start_time field in EIT section |

-continued

| Usage_property (Uprop) | Description | Usage_parameter (Upar) | Description | Argument |
|---|---|---|---|---|
| | | 0001 | Until (absolute data/time) | 40 bits: as for start_time field in EIT section |
| | | 0010 | For (relative time) | 24 bits: as for duration field in EIT section |
| | | 0011-1111 | Reserved | None |
| 0101-1111 | Reserved for future use | 0000-1111 | Reserved | None |

15. Method according to claim 13, wherein at least one of said usage rights information (CURI) and the usage state information (USI) is formed with respect to said bits of said first finite binary code of the respective at least one of the usage rights information (CURI) and the usage state information (USI) item for one of said first and the usage property information part (UProp) and with respect to said bits of said second finite binary code of the further specification of the respective at least one of the usage rights information (CURI) and the usage state information (USI) item for one of said second and the usage parameter information part (UPar) according to the following tables:

| Usage Property (Uprop) | Description | Usage Parameter (Upar) | Description | Argument |
|---|---|---|---|---|
| 0000 | Copy Control | 0000 | Copy Control Not Asserted | None |
| | | 0001 | Copy One Generation | 8 bits: Maximum number of copies; 0x0 means no restriction; 0x1 is equivalent to Copy Once |
| | | 0010 | Copy Once | None |
| | | 0011 | Copy No More | None |
| | | 0100 | Copy Never | None |
| | | 0101 | Copy Never, Zero Retention | None |
| | | 0110-1111 | Reserved for future use | None |
| 0001 | Concurrent Render Restriction | 0000 | Restriction not asserted | None |
| | | 0001 | Restriction asserted | 8 bits: Maximum number of concurrent renderings |
| 0010 | Time-based Usage Restriction | 0000 | Restriction not asserted | None |
| | | 0001 | From (absolute data/time) | 40 bits: as for start_time field in EIT section |
| | | 0010 | Until (absolute data/time) | 40 bits: as for start_time field in EIT section |
| | | 0011 | For (relative time) | 24 bits: as for duration field in EIT section |
| | | 0100-1111 | Reserved | None |
| 0011 | Content Scrambling Not Required | 0000 | Reserved | None |
| 0100-0111 | Reserved for future use | 0000-1111 | Reserved | None | and

| Usage Property (Uprop) | Description | Usage Parameter (Upar) | Description | Argument |
|---|---|---|---|---|
| 1000 | Restrict to authorised domain | 0000 | Reserved | None |
| 1001 | Restrict to localized authorised domain | 0000 | Reserved | None |
| 1010 | Restrict to geographic area | 0000 | Excluded Area | Data to identify the geographic area |
| | | 0001 | Included Area | Data to identify the geographic area |
| | | 0010-1111 | Reserved | None |
| 1011 | Restrict to local environment | 0000 | Reserved | None |
| 1100-1101 | Reserved for future use | 0000-1111 | Reserved | None |
| 1110 | Controlled Export | 0000 | Disable Export | 8-bit identifier of external system |
| | | 0001 | Enable Export | 8-bit identifier of external system |
| | | 0010-1111 | Reserved | None |
| 1111 | Propagation restriction not asserted | 0000 | Reserved | None |

16. Method according to claim 3, wherein in the USI data structure for an item of content a first section consisting of a mandatory content management USI is provided which defines global content management usage rights for the content item throughout the CPCM system.

17. Method according to claim 16, wherein said first section consisting of said mandatory content management USI is followed by a section defining an outer propagation restriction USI for the content item.

18. Method according to claim 17,
wherein said outer propagation restriction is "propagation restriction not asserted" (PRNA),
wherein no other propagation restriction is specified, and
wherein a first global content management USI comprises one of "copy control not asserted" (CCNA) and "do not scramble" (DNSC), with no other content management USI specified.

19. Method according to claim 17, wherein the outer propagation restriction USI is provided for "controlled export" to be the only controlled export USI for the given content to realize controlled export as an effectively globally valid propagation restriction.

20. Method according to claim 17, wherein the outer propagation restriction USI is followed by an additional set of content management USI, to specify a different set of content management usage rules for a given content item which applies only within an area corresponding to the outer propagation restriction USI.

21. Method according to claim 17, wherein the outer propagation restriction USI and any respective content management USI section are followed by a section defining an inner propagation restriction USI for a given content item.

22. Method according to claim 17, wherein an inner propagation restriction is one of propagation restriction usage properties "restrict to localized authorized domain (AD)" (RT-LAD) and "restrict to local environment (LE)" (RTLE).

23. Method according to claim 17,
wherein the outer propagation restriction USI is "restrict to authorized domain (AD)" (RTAD), and
wherein only "restrict to localized authorized domain (AD)" (RTLAD) is valid as a corresponding inner propagation restriction USI.

24. Method according to claim 17,
wherein the outer propagation restriction USI is "restrict to geographic area" (RTGA), and
wherein only "restrict to local environment (LE)" (RTLE) is valid as a corresponding inner propagation restriction USI.

25. Method according to claim 17, wherein an inner propagation restriction USI is followed by an additional set of content management USI in order to specify a different set of content management usage rules for a given content item which applies only within an area corresponding to the inner propagation restriction USI.

26. Method according to claim 17, wherein content management USI usage property settings which are specified in a first globally valid section are also valid for outer and inner propagation restrictions unless the respective content management USI usage property contains a different setting for one of the outer and the inner propagation restriction.

27. Method according to claim 3, wherein at least one of said content management usage rights information and the usage state information may be formed with respect to bits of a first finite binary code of at least one of the respective usage rights information and the usage state information item for one of first and usage property information part and with respect to bits of a second finite binary code of the further specification of the respective at least one of the usage rights information and the usage state information item for one of a second and the usage parameter information part according to the following table:

| Usage Property (Uprop) | Description | Usage Parameter (Upar) | Description | Argument |
|---|---|---|---|---|
| 0000 | Copy Control | 0000 | Copy Never, Zero Retention | None |
| | | 0001 | Copy Never | None |
| | | 0010 | Copy Once | None |
| | | 0011 | Copy One Generation | 8 bits: Maximum number of copies; 0x0 means no restriction; 0x1 is equivalent to Copy Once |
| | | 0100 | Copy No More | None |

-continued

| Usage Property (Uprop) | Description | Usage Parameter (Upar) | Description | Argument |
|---|---|---|---|---|
| | | 0101 | Copy Control Not Asserted | None |
| | | 0110-1111 | Reserved for future use | None |
| 0001 | Concurrent Render Restriction | 0000 | Restriction not asserted | None |
| | | 0001 | Restriction asserted | 8 bits: Maximum number of concurrent renderings |
| 0010 | Time-based Usage Restriction | 0000 | Restriction not asserted | None |
| | | 0001 | From (absolute data/time) | 40 bits: as for start_time field in EIT section |
| | | 0010 | Until (absolute data/time) | 40 bits: as for start_time field in EIT section |
| | | 0011 | For (relative time) | 24 bits: as for duration field in EIT section |
| | | 0100-1111 | Reserved | None |
| 0011 | Content Scrambling Not Required | 0000 | Reserved | None |
| 0100-0111 | Reserved for future use | 0000-1111 | Reserved | None |

28. Method according to claim 3, wherein at least one of said propagation restriction usage rights information and the usage state information may be formed with respect to bits of a first finite binary code of the respective usage rights information and the usage state information item for one of a first and usage property information part and with respect to bits of a second finite binary code of a further specification of the respective at least one of the usage rights information and the usage state information item for one of a second and the usage parameter information part according to the following table:

| Usage Property (Uprop) | Description | Usage Parameter (Upar) | Description | Argument |
|---|---|---|---|---|
| 1000 | Restrict to CPCM system | 0000 | Reserved | None |
| 1001 | Restrict to authorised domain | 0000 | Reserved | None |
| 1010 | Restrict to localized authorised domain | 0000 | Reserved | None |
| 1011 | Restrict to geographic area | 0000 | Excluded Area | Data to identify the geographic area |
| | | 0001 | Included Area | Data to identify the geographic area |
| | | 0010-1111 | Reserved | None |
| 1100 | Restrict to local environment | 0000 | Reserved | None |
| 1101 | Controlled Export | 0000 | Disable Export | 8-bit identifier of external system |
| | | 0001 | Enable Export | 8-bit identifier of external system |
| | | 0010-1111 | Reserved | None |
| 1110 | Usage by CPCM Extension | 0000 or 0000-1111 | Reserved or 4-bits higher CPCM Extension id | 8-bit lower CPCM Extension id |
| 1111 | Propagation restriction not asserted | 0000 | Reserved | None | propagation restriction entry to specify the usage rules in that realm.

29. Method according to claim 3, wherein at least one of said usage rights information (CURI) and the usage state information (USI) are formed with respect to bits of a first finite binary code of the respective at least one of the usage rights information (CURI) and the usage state information (USI) item for one of a first and the usage property information part (UProp) and with respect to bits of a second finite binary code of a further specification of the respective at least one of the usage rights information (CURI) and the usage state information (USI) item for one of said second or usage parameter information part (UPar) according to the following tables:

| Usage Property (Uprop) | Description | Usage Parameter (Upar) | Description | Argument |
|---|---|---|---|---|
| 0000 | Copy Control | 0000 | Copy Control Not Asserted | None |
|  |  | 0001 | Copy One Generation | 8 bits: Maximum number of copies; 0x0 means no restriction; 0x1 is equivalent to Copy Once |
|  |  | 0010 | Copy Once | None |
|  |  | 0011 | Copy No More | None |
|  |  | 0100 | Copy Never | None |
|  |  | 0101 | Copy Never, Zero Retention | None |
|  |  | 0110-1111 | Reserved for future use | None |
| 0001 | Concurrent Render Restriction | 0000 | Restriction not asserted | None |
|  |  | 0001 | Restriction asserted | 8 bits: Maximum number of concurrent renderings |
| 0010 | Time-based Usage Restriction | 0000 | Restriction not asserted | None |
|  |  | 0001 | From (absolute data/time) | 40 bits: as for start_time field in EIT section |
|  |  | 0010 | Until (absolute data/time) | 40 bits: as for start_time field in EIT section |
|  |  | 0011 | For (relative time) | 24 bits: as for duration field in EIT section |
|  |  | 0100-1111 | Reserved | None |
| 0011 | Content Scrambling Not Required | 0000 | Reserved | None |
| 0100-0111 | Reserved for future use | 0000-1111 | Reserved | None | and

| Usage Property (Uprop) | Description | Usage Parameter (Upar) | Description | Argument |
|---|---|---|---|---|
| 1000 | Restrict to CPCM system | 0000 | Reserved | None |
| 1001 | Restrict to authorised domain | 0000 | Reserved | None |
| 1010 | Restrict to localized authorised domain | 0000 | Reserved | None |
| 1011 | Restrict to geographic area | 0000 | Excluded Area | Data to identify the geographic area |
|  |  | 0001 | Included Area | Data to identify the geographic area |
|  |  | 0010-1111 | Reserved | None |
| 1100 | Restrict to local environment | 0000 | Reserved | None |

-continued

| Usage Property (Uprop) | Description | Usage Parameter (Upar) | Description | Argument |
|---|---|---|---|---|
| 1101 | Controlled Export | 0000 | Disable Export | 8-bit identifier of external system |
| | | 0001 | Enable Export | 8-bit identifier of external system |
| | | 0010-1111 | Reserved | None |
| 1110 | Usage by CPCM Extension | 0000 or 0000-1111 | Reserved or 4-bits higher CPCM Extension id | 8-bit lower CPCM Extension id |
| 1111 | Propagation restriction not asserted | 0000 | Reserved | None |

30. Method according to claim 3,
wherein in the USI data structure for an item of content a first section consisting of a top-level propagation restriction followed by associated content management USI defines a default content management usage rights for the content item, and
wherein a top-level propagation restriction may be given as one of propagation restriction usage properties "restrict to CPCM system", "restrict to authorized domain (AD) ", "restrict to geographic area" (RTGA), and "restrict to local environment (LE)" (RTLE).

31. Method according to claim 30, wherein the first section consisting of said top-level propagation restriction and content management USI may be followed by a section defining an outer propagation restriction USI for the content item.

32. Method according to claim 31, wherein when top-level propagation restriction is one of the propagation restriction usage properties "restrict to authorized domain (AD)", "restrict to geographic area" (RTGA), and "restrict to local environment (LE)" (RTLE), the top-level propagation restriction constitutes also said outer propagation restriction for the content.

33. Method according to claim 31, wherein the outer propagation is "restrict to AD" and content management is one of "copy one generation" and "copy control not asserted", and a second outer propagation is "restrict to local environment" and content management there is "copy never".

34. Method according to claim 30, wherein one of a top-level and the outer propagation restriction is "propagation restriction not asserted" (PRNA), in which case no further propagation restriction is specified, and the first top-level propagation restriction is "restrict to CPCM system", and the first top-level content management USI comprises one of a group consisting of "copy control not asserted" (CCNA) and "do not scramble" (DNSC), with no other content management USI specified.

35. Method according to claim 3, wherein an outer propagation restriction is provided for "usage by CPCM extension" to provide different USI for use with the given content within realms of a specified known system as an extension to the CPCM system.

36. Method according to claim 35, wherein for each CPCM extension system, only one outer propagation restriction for "usage by CPCM extension" is specified for the given content.

37. Method according to claim 35, wherein there is more than one outer propagation restriction for "usage by CPCM extension" whereby each provides alternative content management usage properties for the respective CPCM extension system.

38. Method according to claim 1, wherein at least one of said content usage rights information (CURI) and the usage state information (USI) comprises one of a plurality of items of a group of items which consists of content management properties including as mandatory propagation restriction properties and assertive optional.

39. Method according to claim 1, wherein at least one of a generation and a display of icons is enabled which indicates at least one of allowed and disallowed functionalities with respect to the respective provided content item (CI).

40. Method for providing protected audio/video content for a content protection and copy management system based on a network of devices, comprising:
obtaining primary data (PDat) representative of a content item (CI) to be provided;
obtaining at least one of content usage rights information (CURI) and usage state information (USI), the content usage rights information (CURI) being descriptive of usage rights (US) and the usage state information (USI) being descriptive of a usage state (US) with respect to the content item (CI) to be provided;
embedding at least one of said content usage rights information (CURI) and a derivative thereof into one of said primary data (PDat) and a derivative thereof, thereby generating secondary data (SDat) representative of the content item (CI) to be provided; and
providing one of said secondary data (SDat) and a derivative thereof as said content item (CI) to be provided with the embedded content usage rights information (CURI),
wherein said content usage rights information (CURI) is embedded repeatedly regularly within one of said primary data (PDat) and said derivative thereof and said repeatedly embedded content usage rights information (CURI) is the same content usage rights information (CURI) throughout said primary data and said derivative thereof.

41. Method according to claim 40, wherein said content usage rights information (CURI) is embedded in a structured binary coded form within one of said primary data (PDat) and said derivative thereof.

42. Method according to claim 1,
wherein at least one of said content usage rights information (CURI) and the usage state information (USI) comprises a mandatory set of at least one of content usage rights information (CURI) and usage state information (USI), and one of an optional set of at least one of content usage rights information (CURI) and usage state information (USI), and an assertive set of at least one of content usage rights and usage state information;

wherein each content item (CI) to be provided is provided with at least one item of said mandatory set of at least one of the content usage rights information (CURI) and the usage state information (USI).

43. A system comprising:

a first obtaining unit that obtains primary data (PDat) representative of a content item (CI) to be provided;

a second obtaining unit that obtains at least one of content usage rights information (CURI) and usage state information (USI), the content usage rights information (CURI) being descriptive of usage rights (UR) and the usage state information (USI) being descriptive of a usage state (US) with respect to the content item (CI) to be provided;

an embedding unit that embeds at least one of said content usage rights information (CURI) the usage state information (USI), and a derivative thereof into one of said primary data (PDat) and a derivative thereof, thereby generating secondary data (SDat) representative of the content item (CI) to be provided; and a providing unit that provides one of said secondary data (SDat) and the derivative thereof as said content item (CI) to be provided with the embedded at least one of the content usage rights information (CURI) and the usage state information (USI), wherein at least one of said content usage rights information (CURI) and the usage state information (USI) is embedded repeatedly in a structured binary coded form within one of said primary data (PDat) and said derivative thereof and said repeatedly embedded content usage rights information (CURI) is the same content usage rights information (CURI) throughout said primary data and said derivative thereof and said repeatedly embedded usage state information (USI) is the same usage state information (USI) throughout said primary data and said derivative thereof.

44. A non-transitory computer readable storage medium having stored thereon a computer program which when executed by a processor causes the processor to perform a method comprising:

obtaining primary data (PDat) representative of a content item (CI) to be provided;

obtaining at least one of content usage rights information (CURI) and usage state information (USI), the content usage rights information (CURI) being descriptive of usage rights (UR) and the usage state information (USI) being descriptive of a usage state (US) with respect to the content item (CI) to be provided;

embedding at least one of said content usage rights information (CURI) the usage state information (USI), and a derivative thereof into one of said primary data (PDat) and a derivative thereof, thereby generating secondary data (SDat) representative of the content item (CI) to be provided; and providing one of said secondary data (SDat) and the derivative thereof as said content item (CI) to be provided with the embedded at least one of the content usage rights information (CURI) and the usage state information (USI), wherein at least one of said content usage rights information (CURI) and the usage state information (USI) is embedded repeatedly in a structured binary coded form within one of said primary data (PDat) and said derivative thereof and said repeatedly embedded content usage rights information (CURI) is the same content usage rights information (CURI) throughout said primary data and said derivative thereof and said repeatedly embedded usage state information (USI) is the same usage state information (USI) throughout said primary data and said derivative thereof.

45. Method for providing protected audio/video content for a content protection and copy management system based on a network of devices, comprising:

obtaining primary data (PDat) representative of a content item (CI) to be provided;

obtaining at least one of content usage rights information (CURI) and usage state information (USI), the content usage rights information (CURI) being descriptive of usage rights (US) and the usage state information (USI) being descriptive of a usage state (US) with respect to the content item (CI) to be provided;

embedding at least one of said usage state information (USI) and a derivative thereof into one of said primary data (PDat) and a derivative thereof, thereby generating secondary data (SDat) representative of the content item (CI) to be provided; and providing one of said secondary data (SDat) and a derivative thereof as said content item (CI) to be provided with the embedded usage state information (USI), wherein said usage state information (USI) is embedded repeatedly regularly within one of said primary data (PDat) and said derivative thereof and said repeatedly embedded usage state information (USI) is the same usage state information (USI) throughout said primary data and said derivative thereof.

* * * * *